United States Patent
Ogata et al.

(10) Patent No.: US 12,367,075 B2
(45) Date of Patent: Jul. 22, 2025

(54) IN-VEHICLE DEVICE, VEHICLE MANAGEMENT SYSTEM, RESOURCE MANAGEMENT METHOD, AND RESOURCE MANAGEMENT PROGRAM FOR ALLOCATION OF COMPUTING RECOURSES BASED ON A USAGE STATE

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Kenta Ogata, Osaka (JP); Takeshi Hagihara, Yokkaichi (JP); Darmawan Go, Yokkaichi (JP); Yasuhiro Yabuuchi, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

(*) Notice: Subject to any disclaimer, the term of this patent is extended or adjusted under 35 U.S.C. 154(b) by 548 days.

(21) Appl. No.: 17/627,925

(22) PCT Filed: Jun. 25, 2020

(86) PCT No.: PCT/JP2020/024982
§ 371 (c)(1),
(2) Date: Jan. 18, 2022

(87) PCT Pub. No.: WO2021/010124
PCT Pub. Date: Jan. 21, 2021

(65) Prior Publication Data
US 2022/0261285 A1    Aug. 18, 2022

(30) Foreign Application Priority Data

Jul. 17, 2019   (JP) ................................ 2019-131582

(51) Int. Cl.
*G06F 9/46* (2006.01)
*G06F 9/50* (2006.01)

(52) U.S. Cl.
CPC ............ *G06F 9/505* (2013.01); *G06F 9/5094* (2013.01); *G06F 2209/5019* (2013.01)

(58) Field of Classification Search
None
See application file for complete search history.

(56) References Cited

U.S. PATENT DOCUMENTS 8,041,976 B2* 10/2011 Kern ..................... G06F 9/5094
713/320
2003/0135767 A1* 7/2003 Chu ........................ G06F 1/206
713/300

(Continued)

FOREIGN PATENT DOCUMENTS

| JP | 2001-202155 A | 7/2001 |
| JP | 2010-079908 A | 4/2010 |

(Continued)

*Primary Examiner* — Bing Zhao
(74) *Attorney, Agent, or Firm* — Oliff PLC

(57) ABSTRACT

An in-vehicle device is mounted to a vehicle and includes: an acquisition unit configured to acquire state information indicating a state of the vehicle; a plurality of physical resources; and an allocation unit configured to change, in accordance with the state indicated by the state information acquired by the acquisition unit, allocation of the physical resources to be used in a target process being one or a plurality of types of processes that should be performed by the in-vehicle device.

13 Claims, 18 Drawing Sheets

| SPEED | OPERATION NUMBER | OPERATION TIME | DATA AMOUNT |
|---|---|---|---|
| 0km/h | 1 | 15 SECONDS | 10Mbps |
| 40km/h | 2 | 25 SECONDS | 20Mbps |
| 60km/h | 3 | 35 SECONDS | 30Mbps |

(56) References Cited

U.S. PATENT DOCUMENTS

| | | | | |
|---|---|---|---|---|
| 2005/0060590 | A1* | 3/2005 | Bradley | G06F 9/5088 |
| | | | | 713/320 |
| 2010/0083273 | A1 | 4/2010 | Sihn et al. | |
| 2012/0260258 | A1 | 10/2012 | Regini et al. | |
| 2015/0169363 | A1 | 6/2015 | Anderson et al. | |
| 2018/0329737 | A1 | 11/2018 | Dong et al. | |
| 2019/0051363 | A1* | 2/2019 | Raasch | G06F 3/0679 |
| 2019/0304531 | A1* | 10/2019 | Shiohara | G11C 7/222 |

FOREIGN PATENT DOCUMENTS

| | | |
|---|---|---|
| JP | 2014-035661 A | 2/2014 |
| JP | 2014-510357 A | 4/2014 |
| JP | 2014-153997 A | 8/2014 |
| JP | 2016-511880 A | 4/2016 |
| JP | 2016-134110 A | 7/2016 |
| JP | 2016-177423 A | 10/2016 |
| JP | 2017-506773 A | 3/2017 |
| JP | 2017-117440 A | 6/2017 |
| WO | 2012/063334 A1 | 5/2012 |
| WO | 2014/123587 A1 | 8/2014 |

* cited by examiner

FIG. 4

| SPEED | OPERATION NUMBER | OPERATION TIME | DATA AMOUNT |
|---|---|---|---|
| 0km/h | 1 | 15 SECONDS | 10Mbps |
| 40km/h | 2 | 25 SECONDS | 20Mbps |
| 60km/h | 3 | 35 SECONDS | 30Mbps |

FIG. 7

| SPEED | OPERATION TIME | DATA AMOUNT | LOAD LEVEL |
|---|---|---|---|
| 0km/h | 15 SECONDS | 10Mbps | 1 |
| 40km/h | 25 SECONDS | 20Mbps | 2 |
| 60km/h | 35 SECONDS | 30Mbps | 4 |

FIG. 8

| LOAD LEVEL | CORE | MEMORY | IF CIRCUIT |
|---|---|---|---|
| 1 | 1 | 1 | 1 |
| 2 | 2 | 1 | 1 |
| 3 | 2 | 1 | 2 |
| 4 | 3 | 2 | 3 |
| ⋮ | ⋮ | ⋮ | ⋮ |
| 10 | 6 | 6 | 6 |

FIG. 15

| | OPERATION TIME |
|---|---|
| CORE 31A | 100 HOURS |
| CORE 31B | 200 HOURS |
| CORE 31C | 50 HOURS |
| ⋮ | ⋮ |
| MEMORY 32A | 100 HOURS |
| ⋮ | ⋮ |
| IF CIRCUIT 33A | 100 HOURS |
| ⋮ | ⋮ |

IN-VEHICLE DEVICE, VEHICLE MANAGEMENT SYSTEM, RESOURCE MANAGEMENT METHOD, AND RESOURCE MANAGEMENT PROGRAM FOR ALLOCATION OF COMPUTING RECOURSES BASED ON A USAGE STATE

TECHNICAL FIELD

The present disclosure relates to an in-vehicle device, a vehicle management system, a resource management method, and a resource management program.

This application claims priority on Japanese Patent Application No. 2019-131582 filed on Jul. 17, 2019, the entire content of which is incorporated herein by reference.

BACKGROUND ART

For example, International Publication No. WO2012/063334 (PATENT LITERATURE 1) discloses a memory control device as follows. That is, the memory control device has connected thereto an electronic calculator and an I/O device, and has a dirty bit array for dividing a specific region of a memory of the electronic calculator into pages and for storing the presence or absence of memory writing for each divided page, and a memory writing monitoring mechanism for monitoring memory writing with respect to the memory of the electronic calculator from the I/O device. When memory writing from the I/O device with respect to the specific region of the memory has been observed by the monitoring mechanism, a page for which the memory writing has been performed is determined on the basis of the address of the memory writing, and the presence of the memory writing with respect to the page is recorded in the dirty bit array.

Japanese Translation of PCT International Application Publication No. 2014-510357 (PATENT LITERATURE 2) discloses a method as below. That is, the method is a method for dynamically determining the degree of parallel processing of a processing load and automatically adjusting the number of cores supporting the processing load in a portable computing device. The method includes: a step of monitoring one or a plurality of process-waiting queues of a multicore processor; a step of calculating a proportion of parallel processing on the basis of a current operation mode of the multicore processor and the monitoring of the one or the plurality of process-waiting queues; a step of determining whether the current operation mode of the multicore processor should be changed, on the basis of the calculated proportion of the parallel processing; and a step of instructing one or a plurality of cores of the multicore processor to switch a dynamic voltage and a frequency scaling algorithm, when it has been determined that the current operation mode of the multicore processor should be changed.

CITATION LIST

Patent Literature

PATENT LITERATURE 1: International Publication No. WO2012/063334
PATENT LITERATURE 2: Japanese Translation of PCT International Application Publication No. 2014-510357
PATENT LITERATURE 3: Japanese Laid-Open Patent Publication No. 2017-117440
PATENT LITERATURE 4: Japanese Laid-Open Patent Publication No. 2014-035661
PATENT LITERATURE 5: Japanese Laid-Open Patent Publication No. 2014-153997
PATENT LITERATURE 6: Japanese Laid-Open Patent Publication No. 2016-134110
PATENT LITERATURE 7: Japanese Laid-Open Patent Publication No. 2001-202155
PATENT LITERATURE 8: Japanese Translation of PCT International Application Publication No. 2016-511880

SUMMARY OF INVENTION

An in-vehicle device of the present disclosure is an in-vehicle device mounted to a vehicle. The in-vehicle device includes: an acquisition unit configured to acquire state information indicating a state of the vehicle; a plurality of physical resources; and an allocation unit configured to change, in accordance with the state indicated by the state information acquired by the acquisition unit, allocation of the physical resources to be used in a target process being one or a plurality of types of processes that should be performed by the in-vehicle device.

A vehicle management system of the present disclosure includes: an in-vehicle device mounted to a vehicle and including a plurality of physical resources; and a management apparatus. The in-vehicle device transmits state information indicating a state of the vehicle, to the management apparatus. The management apparatus predicts a processing load of the in-vehicle device on the basis of the state information received from the in-vehicle device, and transmits load information indicating a prediction result, to the in-vehicle device. In accordance with the prediction result indicated by the load information received from the management apparatus, the in-vehicle device changes allocation of the physical resources to be used in a target process being one or a plurality of types of processes that should be performed by the in-vehicle device.

A resource management method of the present disclosure is performed in an in-vehicle device that is mounted to a vehicle and includes a plurality of physical resources. The resource management method includes: a step of acquiring state information indicating a state of the vehicle; and a step of changing, in accordance with the state indicated by the acquired state information, allocation of the physical resources to be used in a target process being one or a plurality of types of processes that should be performed by the in-vehicle device.

A resource management method of the present disclosure is performed in a vehicle management system that includes a management apparatus and an in-vehicle device mounted to a vehicle and including a plurality of physical resources. The resource management method includes: a step, performed by the in-vehicle device, of transmitting state information indicating a state of the vehicle, to the management apparatus; a step, performed by the management apparatus, of predicting a processing load of the in-vehicle device on the basis of the state information received from the in-vehicle device, and of transmitting load information indicating a prediction result, to the in-vehicle device; and a step, performed by the in-vehicle device, of changing, in accordance with the prediction result indicated by the load information received from the management apparatus, allocation of the physical resources to be used in a target process being one or a plurality of types of processes that should be performed by the in-vehicle device.

A resource management program of the present disclosure is to be used in an in-vehicle device that is mounted to a vehicle and includes a plurality of physical resources. The resource management program is for causing a computer to function as: an acquisition unit configured to acquire state information indicating a state of the vehicle; and an allocation unit configured to change, in accordance with the state indicated by the state information acquired by the acquisition unit, allocation of the physical resources to be used in a target process being one or a plurality of types of processes that should be performed by the in-vehicle device.

A resource management program of the present disclosure is to be used in an in-vehicle device in a vehicle management system. The in-vehicle device is mounted to a vehicle and includes a plurality of physical resources. The vehicle management system includes the in-vehicle device and a management apparatus. The resource management program is for causing a computer to function as: a communication unit configured to transmit state information indicating a state of the vehicle, to the management apparatus, and to receive from the management apparatus, load information indicating a prediction result of a processing load of the in-vehicle device predicted by the management apparatus on the basis of the state information received from the in-vehicle device; and an allocation unit configured to change, in accordance with the prediction result indicated by the load information from the management apparatus received by the communication unit, allocation of the physical resources to be used in a target process being one or a plurality of types of processes that should be performed by the in-vehicle device.

One mode of the present disclosure can be realized not only as an in-vehicle device that includes such a characteristic processing unit, but also as a semiconductor integrated circuit that realizes a part or the entirety of the in-vehicle device.

One mode of the present disclosure can be realized not only as a vehicle management system that includes such a characteristic processing unit, but also as a program for causing a computer to execute such characteristic process steps. One mode of the present disclosure can be realized as a semiconductor integrated circuit that realizes a part or the entirety of the vehicle management system.

BRIEF DESCRIPTION OF DRAWINGS

FIG. 4 shows an example of state information to be used in the in-vehicle device according to the first embodiment of the present disclosure.

FIG. 7 shows an example of load level information to be used in the in-vehicle device according to the first embodiment of the present disclosure.

FIG. 8 shows an example of allocation information to be used in the in-vehicle device according to the first embodiment of the present disclosure.

FIG. 15 shows an example of wear information used in the in-vehicle device according to the first embodiment of the present disclosure.

DESCRIPTION OF EMBODIMENTS

Figure 1:
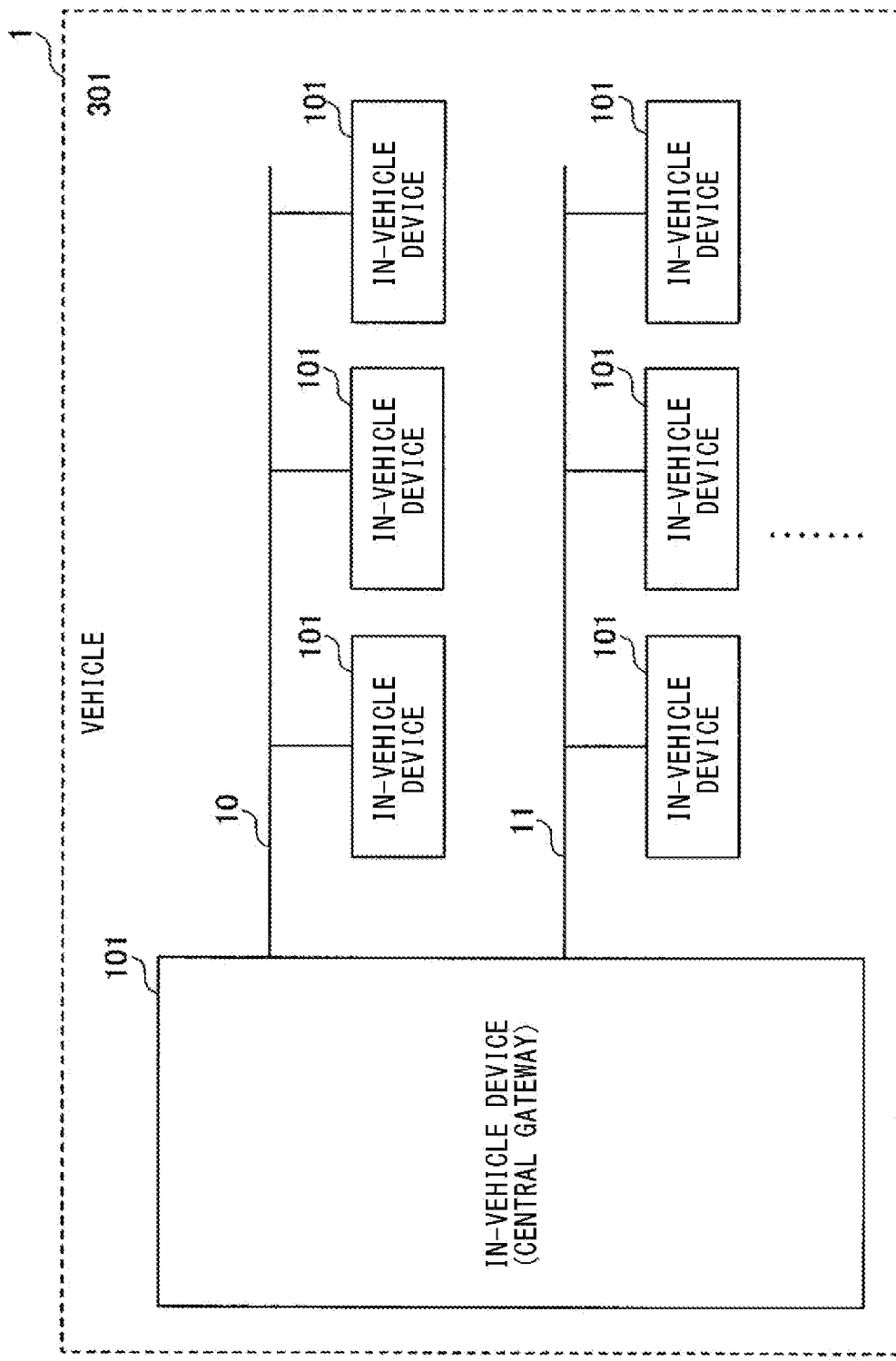
FIG. 1 shows a configuration of an in-vehicle communication system according to a first embodiment of the present disclosure.

Problems to be Solved by the Present Disclosure

In association with advancement of devices, it is considered that, in vehicles, integration of functions of a plurality of ECUs (Electronic Control Units) will be promoted, i.e., one in-vehicle device will provide a plurality of applications.

Power consumption of an in-vehicle device increases in association with increase of applications that should be provided by the in-vehicle device. Such an increase in power consumption has a great influence on the cruising distance of an electric vehicle, for example.

The present disclosure has been made in order to solve the above-described problem. An object of the present disclosure is to provide an in-vehicle device, a vehicle management system, a resource management method, and a resource management program that are capable of effectively reducing power consumption while executing necessary processes in the in-vehicle device.

Effects of the Present Disclosure

According to the present disclosure, in an in-vehicle device, it is possible to effectively reduce power consumption while executing necessary processes.

DESCRIPTION OF EMBODIMENT OF THE PRESENT DISCLOSURE

First, contents of embodiments of the present disclosure are listed and described.

(1) An in-vehicle device according to an embodiment of the present disclosure is mounted to a vehicle. The in-vehicle device includes: an acquisition unit configured to acquire state information indicating a state of the vehicle; a plurality of physical resources; and an allocation unit configured to change, in accordance with the state indicated by the state information acquired by the acquisition unit, allocation of the physical resources to be used in a target process being one or a plurality of types of processes that should be performed by the in-vehicle device.

As described above, in accordance with the state of the vehicle having the in-vehicle device mounted thereto, with respect to a plurality of physical resources in the in-vehicle device, allocation of physical resources that should be caused to execute the target process is changed. According to this configuration, it is possible to select appropriate physical resources in accordance with the state of the vehicle, and to cause the physical resources to perform the target process. Therefore, in the in-vehicle device, it is possible to effectively reduce power consumption while executing necessary processes.

(2) Preferably, the allocation unit predicts a processing load of the in-vehicle device on the basis of the state information, and changes the allocation in accordance with a prediction result.

According to this configuration, a more appropriate allocation content in consideration of the processing load, of the in-vehicle device, predicted from the state of the vehicle can be determined. That is, allocation of physical resources can be caused to follow the load, of the target process, which increases or decreases in accordance with the state of the vehicle.

(3) Preferably, in accordance with the state indicated by the state information, the allocation unit determines the number of the physical resources that are useable, and allocates the determined number of the physical resources to the target process.

According to this configuration, the number of useable physical resources can be increased or decreased in accordance with the state of the vehicle. Thus, power consumption can be more effectively reduced.

(4) Preferably, the allocation unit is capable of switching a state where a plurality of the physical resources are allocated to a plurality of types of processes that should be performed by the in-vehicle device, to a state where a smaller number of the physical resources than the number of the physical resources allocated to the plurality of types of processes are to be allocated to the plurality of types of processes.

According to this configuration, a part or all of the plurality of types of processes can be caused to be implemented using common physical resources when compared with the state before the change. Therefore, more efficient use of physical resources is enabled. In addition, there is no need to perform arbitration of the execution timing between a plurality of applications that respectively execute a plurality of types of processes. Thus, reduction of power consumption can be easily realized without adding an arbitration function to an application.

(5) Preferably, when the number of the physical resources to be allocated to the target process is to be decreased, the allocation unit stops at least one of power supply and clock supply to the physical resource to be excluded from the allocation to the target process.

According to this configuration, power consumption of unused physical resources can be reduced to a greater extent.

(6) Preferably, the allocation unit executes changing of the allocation when a hysteresis is provided in a case where the number of the physical resources to be allocated to the target process is to be decreased and in a case where the number of the physical resources to be allocated to the target process is to be increased, or when the state for which the allocation of the physical resources should be changed has continued for a predetermined time.

According to this configuration, a situation where the allocation content of physical resources is frequently changed can be suppressed, and operation of the in-vehicle device can be stabilized.

(7) Preferably, the acquisition unit further acquires a plurality of pieces of wear information regarding respective degrees of wear of the plurality of physical resources, and the allocation unit changes the allocation of the physical resources further on the basis of each of the pieces of wear information acquired by the acquisition unit.

According to this configuration, increase of the degree of wear of a specific physical resource can be suppressed, and the useable time of the in-vehicle device can be further extended.

(8) A vehicle management system according to an embodiment of the present disclosure includes: an in-vehicle device mounted to a vehicle and including a plurality of physical resources; and a management apparatus. The in-vehicle device transmits state information indicating a state of the vehicle, to the management apparatus. The management apparatus predicts a processing load of the in-vehicle device on the basis of the state information received from the in-vehicle device, and transmits load information indicating a prediction result, to the in-vehicle device. In accordance with the prediction result indicated by the load information received from the management apparatus, the in-vehicle device changes allocation of the physical resources to be used in a target process being one or a plurality of types of processes that should be performed by the in-vehicle device.

As described above, in accordance with the state of the vehicle having the in-vehicle device mounted thereto, with respect to a plurality of physical resources in the in-vehicle device, allocation of physical resources that should be caused to execute the target process is changed. According to this configuration, it is possible to select appropriate physical resources in accordance with the state of the vehicle, and to cause the physical resources to perform the target process. Therefore, in the in-vehicle device, it is possible to effectively reduce power consumption while executing necessary processes.

(9) A resource management method according to an embodiment of the present disclosure is performed in an in-vehicle device that is mounted to a vehicle and includes a plurality of physical resources. The resource management method includes: a step of acquiring state information indicating a state of the vehicle; and a step of changing, in accordance with the state indicated by the acquired state information, allocation of the physical resources to be used in a target process being one or a plurality of types of processes that should be performed by the in-vehicle device.

As described above, in accordance with the state of the vehicle having the in-vehicle device mounted thereto, with respect to a plurality of physical resources in the in-vehicle device, allocation of physical resources that should be caused to execute the target process is changed. According to this configuration, it is possible to select appropriate physical resources in accordance with the state of the vehicle, and to cause the physical resources to perform the target process. Therefore, in the in-vehicle device, it is possible to effectively reduce power consumption while executing necessary processes.

(10) A resource management method according to an embodiment of the present disclosure is performed in a vehicle management system that includes a management apparatus and an in-vehicle device mounted to a vehicle and including a plurality of physical resources. The resource management method includes: a step, performed by the in-vehicle device, of transmitting state information indicating a state of the vehicle, to the management apparatus; a step, performed by the management apparatus, of predicting a processing load of the in-vehicle device on the basis of the state information received from the in-vehicle device, and of transmitting load information indicating a prediction result, to the in-vehicle device; and a step, performed by the in-vehicle device, of changing, in accordance with the prediction result indicated by the load information received from the management apparatus, allocation of the physical resources to be used in a target process being one or a plurality of types of processes that should be performed by the in-vehicle device.

As described above, in accordance with the state of the vehicle having the in-vehicle device mounted thereto, with respect to a plurality of physical resources in the in-vehicle device, allocation of physical resources that should be caused to execute the target process is changed. According to this configuration, it is possible to select appropriate physical resources in accordance with the state of the vehicle, and to cause the physical resources to perform the target process. Therefore, in the in-vehicle device, it is possible to effectively reduce power consumption while executing necessary processes.

(11) A resource management program according to an embodiment of the present disclosure is to be used in an in-vehicle device that is mounted to a vehicle and includes a plurality of physical resources. The resource management program is for causing a computer to function as: an acquisition unit configured to acquire state information indicating a state of the vehicle; and an allocation unit configured to change, in accordance with the state indicated by the state information acquired by the acquisition unit, allocation of the physical resources to be used in a target process being one or a plurality of types of processes that should be performed by the in-vehicle device.

As described above, in accordance with the state of the vehicle having the in-vehicle device mounted thereto, with respect to a plurality of physical resources in the in-vehicle device, allocation of physical resources that should be caused to execute the target process is changed. According to this configuration, it is possible to select appropriate physical resources in accordance with the state of the vehicle, and to cause the physical resources to perform the target process. Therefore, in the in-vehicle device, it is possible to effectively reduce power consumption while executing necessary processes.

(12) A resource management program according to an embodiment of the present disclosure is to be used in an in-vehicle device in a vehicle management system. The in-vehicle device is mounted to a vehicle and includes a plurality of physical resources. The vehicle management system includes the in-vehicle device and a management apparatus. The resource management program is for causing a computer to function as: a communication unit configured to transmit state information indicating a state of the vehicle, to the management apparatus, and to receive from the management apparatus, load information indicating a prediction result of a processing load of the in-vehicle device predicted by the management apparatus on the basis of the state information received from the in-vehicle device; and an allocation unit configured to change, in accordance with the prediction result indicated by the load information from the management apparatus received by the communication unit, allocation of the physical resources to be used in a target process being one or a plurality of types of processes that should be performed by the in-vehicle device.

As described above, in accordance with the state of the vehicle having the in-vehicle device mounted thereto, with respect to a plurality of physical resources in the in-vehicle device, allocation of physical resources that should be caused to execute the target process is changed. According to this configuration, it is possible to select appropriate physical resources in accordance with the state of the vehicle, and to cause the physical resources to perform the target process. Therefore, in the in-vehicle device, it is possible to effectively reduce power consumption while executing necessary processes.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

First Embodiment

[Configuration and Basic Operation]

FIG. 1 shows a configuration of an in-vehicle communication system according to a first embodiment of the present disclosure.

With reference to FIG. 1, an in-vehicle communication system 301 includes a plurality of in-vehicle devices 101 mounted to a vehicle 1.

The plurality of in-vehicle devices 101 are connected to each other via, for example, a CAN bus 10 according to the CAN (Controller Area Network) (registered trademark) standard, or an Ethernet (registered trademark) cable 11. As an example, one in-vehicle device 101 in the in-vehicle communication system 301 is a central gateway. The in-vehicle device 101 performs a target process, which is one or a plurality of types of processes, e.g., one or a plurality of types of arithmetic processes for controlling the vehicle 1.

Figure 2:
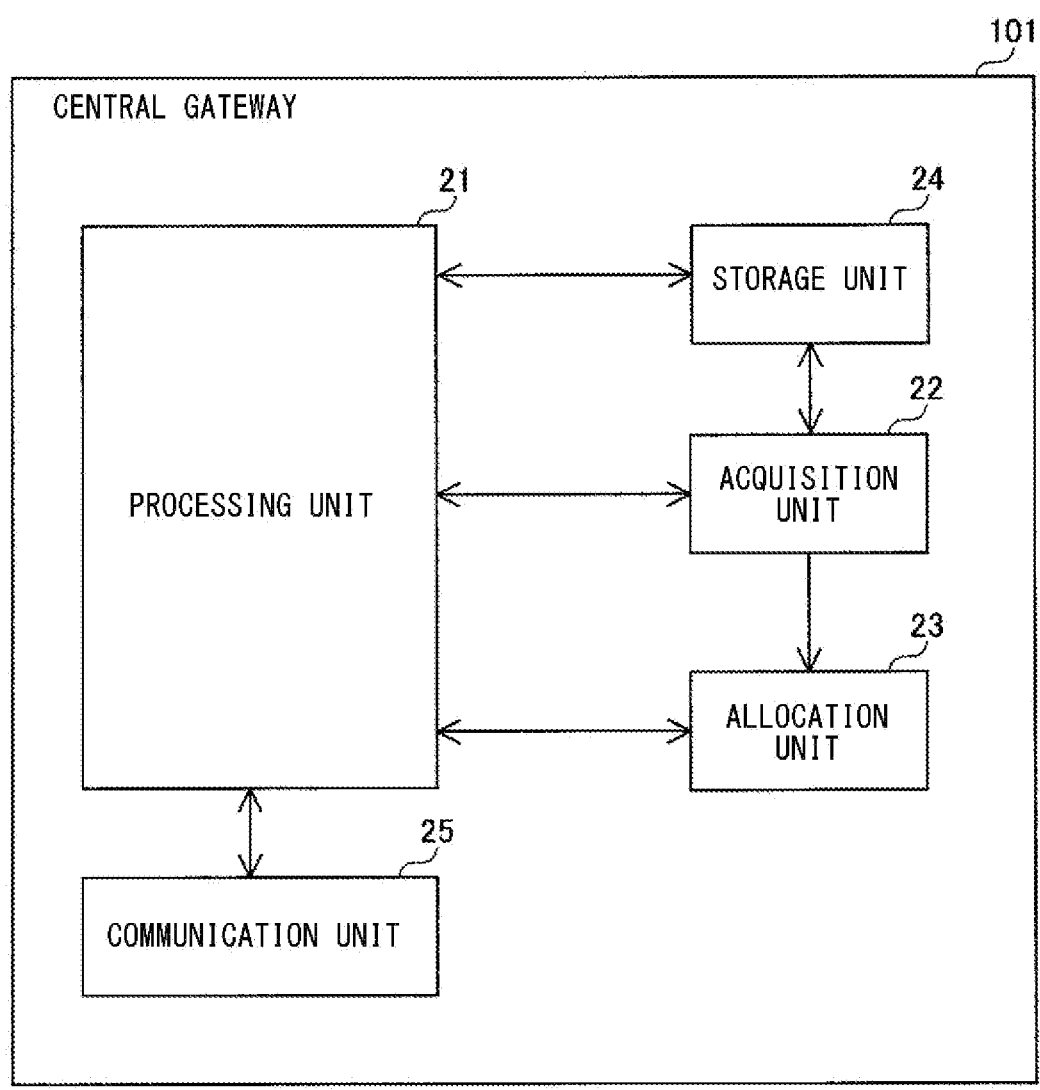
FIG. 2 is a function block diagram of an in-vehicle device according to the first embodiment of the present disclosure.

FIG. 2 is a function block diagram of an in-vehicle device according to the first embodiment of the present disclosure.

With reference to FIG. 2, the in-vehicle device 101 includes a processing unit 21, an acquisition unit 22, an allocation unit 23, a storage unit 24, and a communication unit 25.

Figure 3:
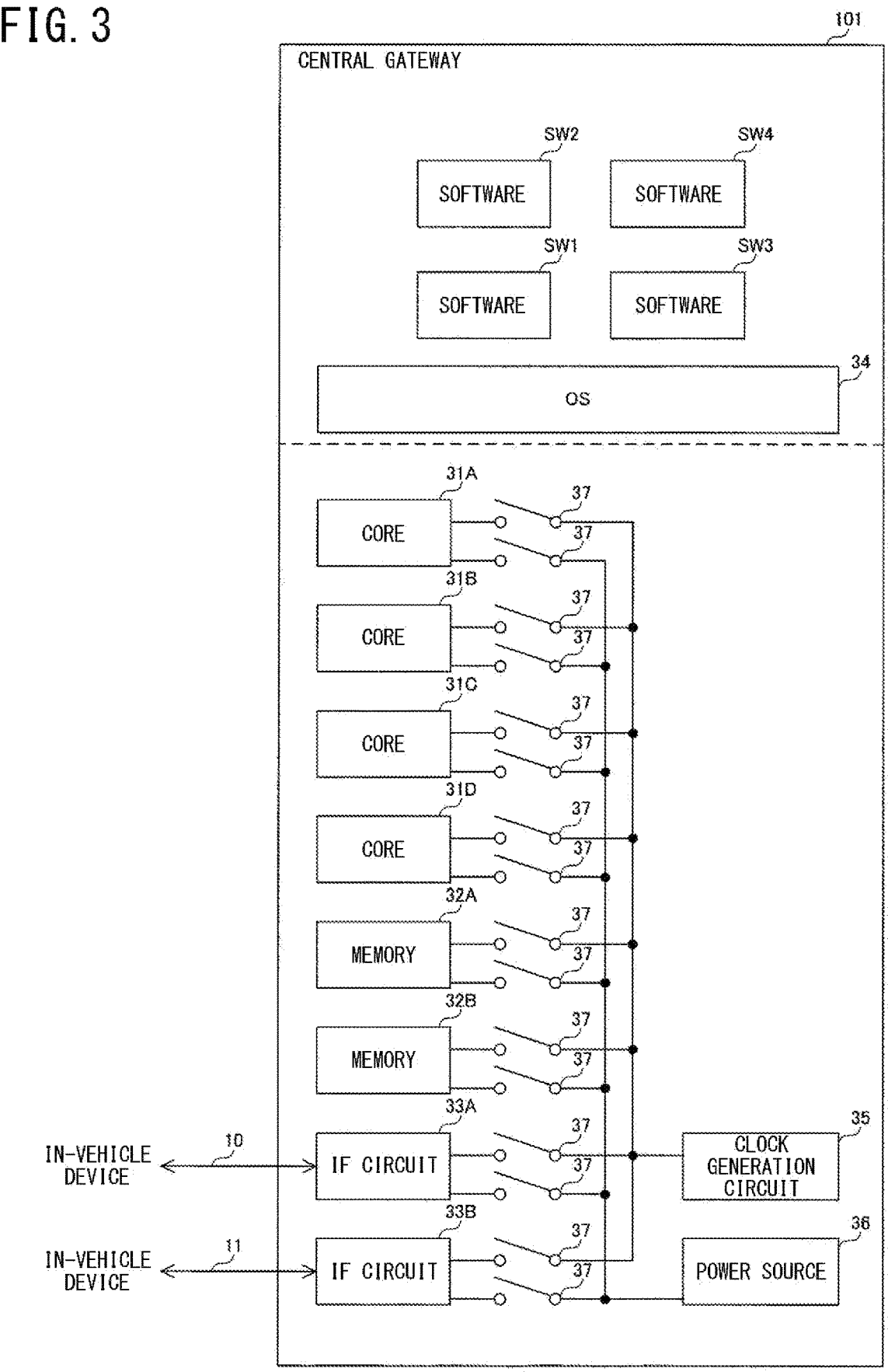
FIG. 3 shows configurations of hardware and software of the in-vehicle device according to the first embodiment of the present disclosure.

FIG. 3 shows configurations of hardware and software of the in-vehicle device according to the first embodiment of the present disclosure.

With reference to FIG. 3, the in-vehicle device 101 includes, for example, cores 31A, 31B, 31C, 31D, memories 32A, 32B, and IF (Interface) circuits 33A, 33B, as a plurality of physical resources. The in-vehicle device 101 also includes a clock generation circuit 35, a power source 36, and a plurality of switches 37.

Hereinafter, each of the cores 31A, 31B, 31C, 31D is also referred to as a core 31, each of the memories 32A, 32B is also referred to as a memory 32, and each of the IF circuits 33A, 33B is also referred to as an IF circuit 33.

The core 31 functions as the processing unit 21 shown in FIG. 2, the memory 32 functions as the storage unit 24 shown in FIG. 2, and the IF circuit 33 functions as the communication unit 25 shown in FIG. 2.

The communication unit 25 performs communication with an in-vehicle device 101 connected thereto via the CAN bus 10 or the Ethernet cable 11.

The clock generation circuit 35 generates a clock signal and performs clock supply of supplying the clock signal to the plurality of physical resources. The power source 36 performs power supply of supplying power to the plurality of physical resources.

The processing unit 21 controls a switch 37 connected between each physical resource and the clock generation circuit 35, and between each physical resource and the power source 36, thereby controlling the clock supply and the power supply to each physical resource.

For example, the in-vehicle device 101 need not necessarily be provided with four cores 31 but may be provided with three or less cores 31 or five or more cores 31; need not necessarily be provided with two memories 32 but may be provided with one memory 32 or three or more memories 32; and need not necessarily be provided with two IF circuits 33 and may be provided with one IF circuit 33 or three or more IF circuits 33.

The in-vehicle device 101 has installed therein software SW1 to SW4 that provides various applications, and an OS (Operating System) 34.

The software SW1 to SW4 each executes various arithmetic processes for providing a plurality of, e.g., four, types of applications.

Specifically, the software SW1 performs processes of controlling apparatuses for providing entertainment services in the vehicle 1, specifically, a display, an audio, and the like, provided in the vehicle 1, for example.

The software SW2 performs processes of controlling apparatuses that are used in accordance with a weather, specifically, a windshield wiper, a fog lamp, and the like, for example.

The software SW3 performs processes of controlling apparatuses that influence the in-vehicle environment of the vehicle 1, specifically, an air conditioner and the like, for example.

The software SW4 performs processes of controlling travelling of the vehicle 1, such as, for example, engine control, AT (Automatic Transmission) control, HEV (Hybrid Electric Vehicle) control, brake control, chassis control, steering control, and instrument display control.

The software SW1 to SW4 is allocated, via the OS 34, to a part or all of the cores 31, the memories 32, and the IF circuits 33, and is executed.

It should be noted that the in-vehicle device 101 may be configured such that one piece of software for providing one type of application is installed therein.

That is, the OS 34 determines allocation of the cores 31, the memories 32, and the IF circuits 33 that should execute the software SW1 to SW4.

Specifically, for example, the OS 34 allocates the software SW1 to the core 31A, allocates the software SW2 to the core 31B, allocates the software SW3 to the core 31C, and allocates the software SW4 to the core 31D.

It should be noted that the OS 34 may allocate one piece of software to a plurality of cores 31, or may allocate a plurality of pieces of software to one core 31.

Problem

In association with advancement of devices, it is considered that, in vehicles, integration of functions of a plurality of ECUs (Electronic Control Units) will be promoted, i.e., one in-vehicle device will provide a plurality of applications.

Power consumption of an in-vehicle device increases in association with increase of applications that should be provided by the in-vehicle device. Such an increase in power consumption has a great influence on the cruising distance of an electric vehicle, for example.

In addition, in an in-vehicle device that performs various arithmetic processes, it is difficult for a piece of software performing a certain arithmetic process to perform an arbitration process for power consumption reduction, with another piece of software performing another arithmetic process.

Therefore, in the in-vehicle device according to the first embodiment of the present disclosure, the above problem is solved by the configuration and operation as described below.

For example, considered is a method of using, in an in-vehicle device 101, software that provides an application for power consumption reduction, independently of the function that is integrated.

Specifically, the in-vehicle device 101 has installed therein software SW5 that performs a process of changing allocation of a physical resource to be used in a target process, which is one or a plurality of types of processes that should be performed by the in-vehicle device 101 and which is for providing one or a plurality of applications. The software SW5 is allocated by the OS 34 to the core 31A, for example.

The software SW5 monitors the state of the vehicle 1 and performs a process of changing allocation of a physical resource to be used in the target process, in accordance with the monitoring result. The software SW5 functions as the acquisition unit 22 and the allocation unit 23.

[Monitoring of Vehicle State]

The acquisition unit 22 in the in-vehicle device 101 acquires state information indicating the state of the vehicle 1.

More specifically, for example, the acquisition unit 22 monitors the number (hereinafter, also referred to as "operation number") of pieces of software in operation in the processing unit 21, and the operation time of each piece of software. Specifically, for example, at each predetermined time interval, the acquisition unit 22 creates operation information indicating the operation number and the maximum value of the operation time of each piece of software in operation.

The acquisition unit 22 monitors the amount of data transmitted between a plurality of physical resources. Specifically, for example, the acquisition unit 22 creates data amount information indicating the data amount at each predetermined time interval.

In addition, the acquisition unit 22 monitors the speed of the vehicle 1. Specifically, for example, the acquisition unit 22 receives, from the processing unit 21, speed information indicating the speed of the vehicle 1, as an arithmetic result by the software SW4 executed by the processing unit 21.

Then, the acquisition unit 22 creates state information that indicates the correspondence relationship between the created operation information and data amount information, and the speed information received from the processing unit 21, stores the state information into the storage unit 24, and outputs the state information to the allocation unit 23.

That is, state information created by the acquisition unit 22 is accumulated in the storage unit 24.

FIG. 4 shows an example of the state information to be used in the in-vehicle device according to the first embodiment of the present disclosure.

With reference to FIG. 4, when the speed of the vehicle 1 is "0 km/h", the operation number is "1", the operation time is "15 seconds" and the data amount is "10 Mbps". When the speed of the vehicle 1 is "40 km/h", the operation number is "2", the operation time is "25 seconds", and the data amount is "20 Mbps". When the speed of the vehicle 1 is "60 km/h", the operation number is "3", the operation time is "35 seconds", and the data amount is "30 Mbps".

[Prediction of Processing Load]

The processing unit 21 performs, periodically or non-periodically, setting of a load level indicating the processing load of the in-vehicle device 101 to which the processing unit 21 belongs.

Specifically, with reference to FIG. 2 again, the processing unit 21 classifies, into a plurality of load levels, each combination (hereinafter, also referred to as a "set") of various types of information included in the state information in the storage unit 24.

More specifically, the processing unit 21 selects a plurality of sets to be used as a reference, for each load level for which the classification is to be performed.

Then, for example, the processing unit 21 creates a judgement model as an example of a machine learning model.

The judgement model can judge the load level of the in-vehicle device 101, on the basis of the speed of the vehicle 1, the operation number, the operation time, and the data amount that are indicated by the state information. The judgement model is an algorithm automatically created through machine learning.

In order to create the judgement model, the processing unit 21 creates a learning data set by using the selected plurality of sets, and stores the created learning data set into the storage unit 24.

Then, for example, the processing unit 21 acquires the learning data set from the storage unit 24, and inputs the acquired learning data set into a multi-layered neural network in accordance with a deep learning technique.

The processing unit 21 creates the judgement model by subjecting the multi-layered neural network to machine learning so as to become able to judge the load level of the in-vehicle device 101 on the basis of the various types of information included in the state information. Then, the processing unit 21 stores the created judgement model into the storage unit 24.

As a result of this machine learning, the judgement model becomes able to judge the load level on the basis of the inputted state information, for example.

Figure 5:
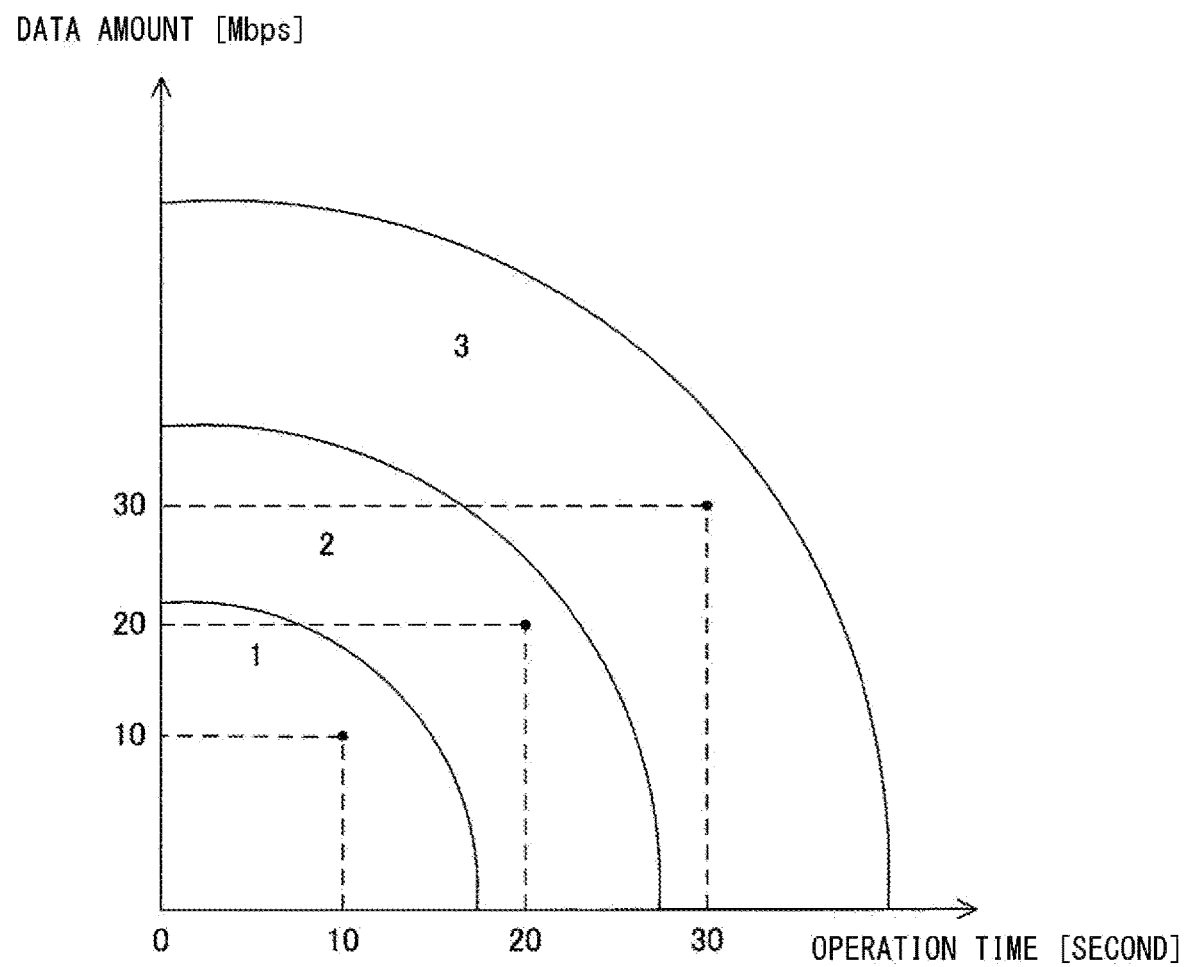
FIG. 5 shows an example of a judgement content of the load level in the in-vehicle device according to the first embodiment of the present disclosure.

FIG. 5 shows an example of a judgement content of the load level in the in-vehicle device according to the first embodiment of the present disclosure. In FIG. 5, the horizontal axis represents the operation time in the state information, and the vertical axis represents the data amount in the state information. FIG. 5 shows the load level in a case where the speed of the vehicle 1 is 40 km/h.

With reference to FIG. 5, for example, when the operation time is "10 seconds" and the data amount is "10 Mbps", the load level is judged to be 1.

When the operation time is "20 seconds" and the data amount is "20 Mbps", the load level is judged to be 2.

When the operation time is "30 seconds" and the data amount is "30 Mbps", the load level is judged to be 3.

Figure 6:
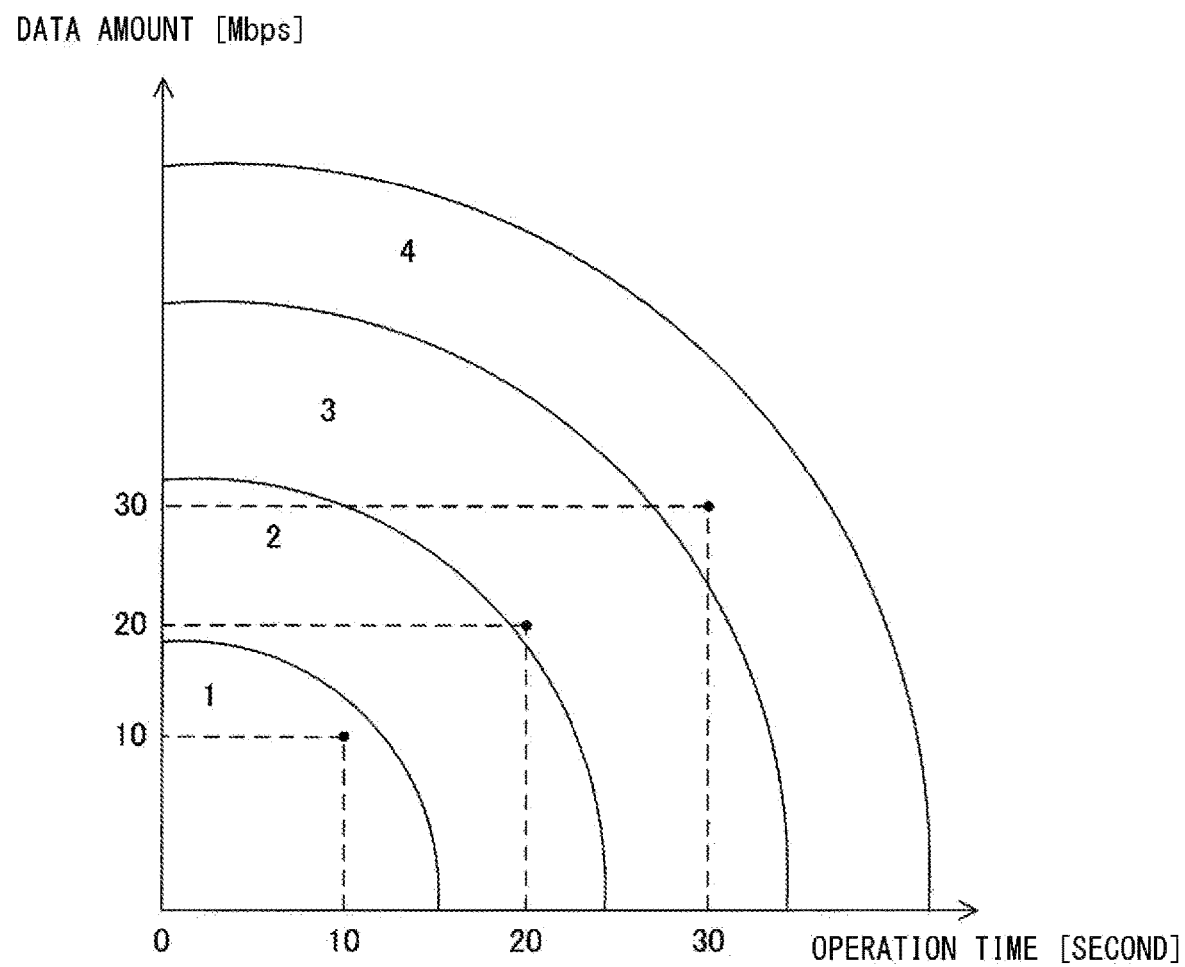
FIG. 6 shows another example of a judgement content of the load level in the in-vehicle device according to the first embodiment of the present disclosure.

FIG. 6 shows another example of a judgement content of the load level in the in-vehicle device according to the first embodiment of the present disclosure. In FIG. 6, the horizontal axis represents the operation number or the operation time in the state information, and the vertical axis represents the data amount in the state information. FIG. 6 shows the load level in a case where the speed of the vehicle 1 is 60 km/h.

With reference to FIG. 6, for example, when the operation time is "10 seconds" and the data amount is "10 Mbps", the load level is judged to be 1.

When the operation time is "20 seconds", and the data amount is "20 Mbps", the load level is judged to be 3.

For example, when the operation time is "30 seconds" and the data amount is "30 Mbps", the load level is judged to be 4.

As shown in FIG. 5 and FIG. 6, in the in-vehicle device 101, the judgement content of the load level differs in accordance with the speed of the vehicle 1. More specifically, the greater the speed of the vehicle 1 is, the more finely the load level is classified.

The judgement model is not limited to the configuration of judging the load level on the basis of the operation time and the data amount in the state information, and may be configured to judge the load level on the basis of the operation number and the data amount.

With reference to FIG. 2 again, the allocation unit 23 predicts a processing load regarding the target process of the in-vehicle device 101, on the basis of the state information.

More specifically, the allocation unit 23 acquires, from the storage unit 24, the judgement model created by the processing unit 21, and judges, by using the acquired judgement model, the load level of the in-vehicle device 101 on the basis of the state information received from the acquisition unit 22.

Specifically, the allocation unit 23 inputs, into the judgement model, the state information received from the acquisition unit 22.

When the state information has been inputted, the judgement model outputs, as a prediction result, load level information, which is state information to which a load level according to the inputted state information is attached as a judgement result, for example.

FIG. 7 shows an example of load level information to be used in the in-vehicle device according to the first embodiment of the present disclosure.

With reference to FIG. 7, when the speed of the vehicle 1 is "0 km/h", the operation time is "15 seconds", and the data amount is "10 Mbps", the load level is "1". When the speed of the vehicle 1 is "40 km/h", the operation time is "25 seconds", and the data amount is "20 Mbps", the load level is "2". When the speed of the vehicle 1 is "60 km/h", the operation time is "35 seconds", and the data amount is "30 Mbps", the load level is "3".

With reference to FIG. 2 again, the allocation unit 23 determines the number of useable physical resources in accordance with the state indicated by the state information acquired by the acquisition unit 22. Then, the allocation unit 23 changes the allocation of physical resources to be used in the target process being one or a plurality of types of processes that should be performed by the in-vehicle device 101.

More specifically, for example, the allocation unit 23 changes the allocation of physical resources to be used in the target process, in accordance with the prediction result based on the state information acquired by the acquisition unit 22.

Specifically, for example, the allocation unit 23 determines the number of physical resources to be allocated to the target process, on the basis of allocation information stored in the storage unit 24.

FIG. 8 shows an example of allocation information to be used in the in-vehicle device according to the first embodiment of the present disclosure.

With reference to FIG. 8, the allocation information shows the correspondence relationship between the load level and physical resources to be allocated to the target process. For example, when the load level is 1, the number of cores 31 to be allocated is 1, the number of memories 32 to be allocated is 1, and the number of IF circuits 33 to be allocated is 1.

More specifically, the allocation unit 23 determines, as the number of physical resources to be allocated to the target process, the number of physical resources, in the allocation information, that corresponds to the load level indicated by the prediction result, i.e., the load level information.

Specifically, when the load level indicated by the load level information is 3, the allocation unit 23 determines the number of cores 31 to be allocated to 2, determines the number of memories 32 to be allocated to 1, and determines the number of IF circuits 33 to be allocated to 2.

When, in the in-vehicle device 101, the determined number of physical resources is different from the current number of physical resources allocated to the target process, the allocation unit 23 changes the number of physical resources allocated to the target process. That is, the allocation unit 23 allocates the determined number of physical resources to the target process.

[Operation of Decreasing Physical Resources]

For example, the allocation unit 23 can switch a state where a plurality of physical resources are allocated to a plurality of types of processes, to a state where a smaller number of physical resources than the number of physical resources allocated to the plurality of types of processes are to be allocated to the plurality of types of processes.

For example, when the current number of cores 31 allocated to the target process is 3, the allocation unit 23 decreases the number of cores 31 allocated to the target process, to 2.

More specifically, for example, the allocation unit 23 outputs, to the OS 34, an instruction to decrease the number of cores 31 to be allocated to the target process, from 3 to 2.

In accordance with the instruction received from the allocation unit 23, the OS 34 decreases the number of cores 31 to be allocated to the target process, from 3 to 2.

Specifically, for example, when the software SW1 and the software SW5 are allocated to the core 31A, the software SW2 and the software SW3 are allocated to the core 31B, and the software SW4 is allocated to the core 31C, the OS 34 allocates the software SW1, the software SW4, and the software SW5 to the core 31A, and allocates the software SW2 and the software SW3 to the core 31B, thereby decreasing the number of cores 31 to be allocated to the target process, from 3 to 2.

For example, when the number of physical resources allocated to the target process is to be decreased, the allocation unit 23 stops at least one of the power supply and the clock supply to the physical resource to be excluded from the allocation to the target process.

More specifically, in the in-vehicle device 101, when the number of cores 31 to be allocated to the target process has been decreased from 3 to 2, the allocation unit 23 stops at least one of the power supply and the clock supply to the core 31 that has been excluded from the allocation.

Specifically, for example, the allocation unit 23 outputs, to the OS 34, in addition to the instruction to decrease the number of cores 31 to be allocated to the target process from 3 to 2, a stop instruction to stop at least one of the power supply and the clock supply to the core 31 to be excluded from the allocation.

In accordance with the stop instruction received from the allocation unit 23, the OS 34 performs a process of stopping at least one of the power supply and the clock supply to the core 31 to be excluded from the allocation.

More specifically, for example, the OS 34 sets the value of a register or the like in the processing unit 21 so as to stop at least one of the power supply and the clock supply to the core 31.

Accordingly, the processing unit 21 turns off at least one of the switch 37 connected between the core 31 and the clock generation circuit 35 and the switch 37 connected between the core 31 and the power source 36, thereby stopping at least one of the power supply and the clock supply to the core 31.

[Variation 1 of Allocation of Physical Resources]

The allocation unit 23 may be configured to execute changing of allocation when the state for which the allocation of physical resources should be changed has continued for a predetermined time.

Figure 9:
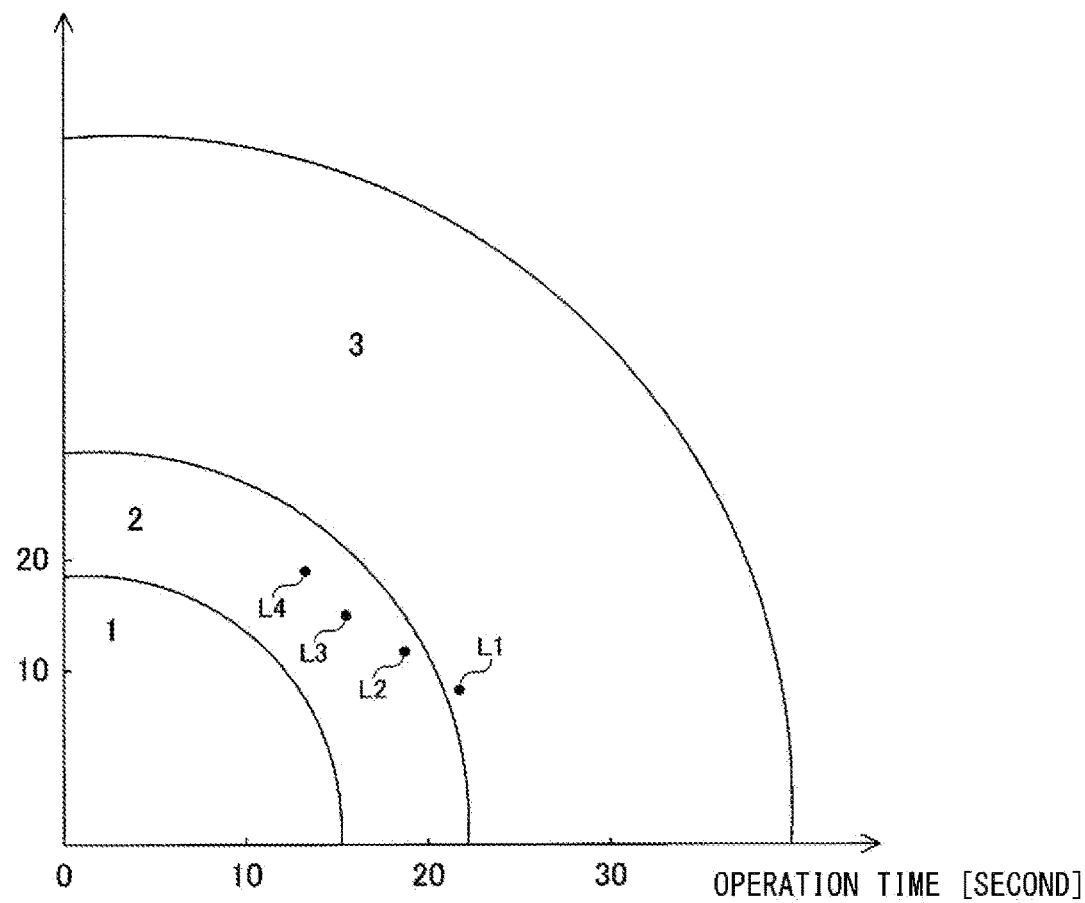
FIG. 9 shows an example of allocation of physical resources according to the load level by the in-vehicle device according to the first embodiment of the present disclosure.

FIG. 9 shows an example of allocation of physical resources according to the load level by the in-vehicle device according to the first embodiment of the present disclosure.

With reference to FIG. 9, on the basis of state information L1 at a certain timing, the allocation unit 23 judges the load level indicated by the prediction result, i.e., the load level information, to be a load level 3. Here, it is assumed that the allocation unit 23 determines to maintain the number of physical resources to be allocated to the target process, at the number of physical resources that corresponds to the load level 3.

Next, on the basis of state information L2 at the next timing, the allocation unit 23 judges the load level to be a load level 2.

At this time, since the duration of the state of the load level 2 is less than a predetermined time, the allocation unit 23 determines to maintain the number of physical resources to be allocated to the target process, at the number of physical resources that corresponds to the load level 3, instead of the number of physical resources that corresponds to the load level 2 indicated by the prediction result, i.e., the load level information.

Next, on the basis of state information L3 at the next timing, the allocation unit 23 judges the load level to be the load level 2.

At this time, since the duration of the state of the load level 2 is less than a predetermined time, the allocation unit 23 determines to maintain the number of physical resources to be allocated to the target process, at the number of physical resource that corresponds to the load level 3, instead of the number of physical resources that corresponds to the load level 2 indicated by the prediction result, i.e., the load level information.

Next, on the basis of state information L4 at the next timing, the allocation unit 23 judges the load level to be the load level 2.

At this time, since the duration of the state of the load level 2 has continued for the predetermined time, the allocation unit 23 determines the number of physical resources allocated to the target process, to the number of physical resources that corresponds to the judged load level 2.

Then, for example, with reference to the allocation information shown in FIG. 8, the allocation unit 23 changes the number of physical resources to be allocated to the target process, since the determined number of physical resources is different from the current number of physical resources allocated to the target process.

[Variation 2 of Allocation of Physical Resources]

The allocation unit 23 in the in-vehicle device 101 may be configured to provide a hysteresis when the number of physical resources to be allocated to the target process is decreased.

In the variation 2 of allocation of physical resources, similar to the variation 1, the allocation unit 23 executes changing of allocation when the state for which the allocation of physical resources should be changed has continued for a predetermined time.

Figure 10:
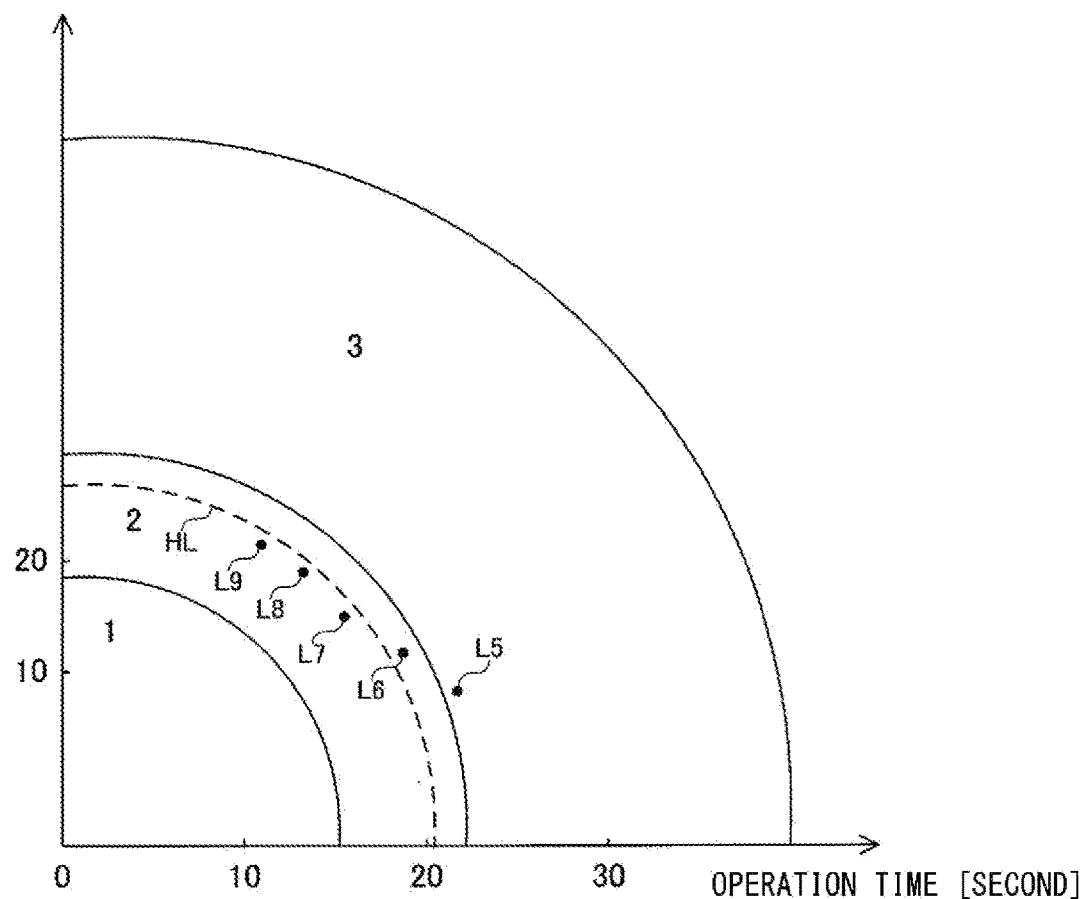
FIG. 10 shows an example, of a judgement content of the load level in which a hysteresis is provided in the in-vehicle device according to the first embodiment of the present disclosure.

FIG. 10 shows an example, of a judgement content of the load level in which a hysteresis is provided in the in-vehicle device according to the first embodiment of the present disclosure.

With reference to FIG. 10, on the basis of state information L5 at a certain timing, the allocation unit 23 judges the load level indicated by the prediction result, i.e., the load level information, to be a load level 3. Here, it is assumed that the allocation unit 23 determines to maintain the number of physical resources to be allocated to the target process, at the number of physical resources that corresponds to the load level 3.

Next, on the basis of state information L6 at the next timing, the allocation unit 23 judges the load level to be a load level 2. At this time, the allocation unit 23 judges that the state information L6 is in a state of exceeding a hysteresis HL.

In this case, the allocation unit 23 determines to maintain the number of physical resources to be allocated to the target process, at the number of physical resources that corresponds to the load level 3, instead of the number of physical resources that corresponds to the load level 2 indicated by the prediction result, i.e., the load level information.

Next, on the basis of state information L7 at the next timing, the allocation unit 23 judges the load level to be the load level 2. At this time, the allocation unit 23 judges that the state information L7 is in a state of being less than the hysteresis HL.

Then, since the duration of the state of being less than the hysteresis HL is less than a predetermined time, the allocation unit 23 determines to maintain the number of physical resources to be allocated to the target process, at the number of physical resources that corresponds to the load level 3, instead of the number of physical resources that corresponds to the load level 2 indicated by the prediction result, i.e., the load level information.

Next, on the basis of state information L8 at the next timing, the allocation unit 23 judges the load level to be the load level 2, and then, further, on the basis of state information L9 at the next timing, the allocation unit 23 judges the load level to be the load level 2. At this time, the allocation unit 23 judges that the state information L8 and the state information L9 are each in a state of being less than the hysteresis HL.

At this time, since the duration of the state of being less than the hysteresis HL has continued for a predetermined time, the allocation unit 23 determines the number of physical resources allocated to the target process, to the number of physical resources that corresponds to the judged load level 2.

Then, for example, with reference to the allocation information shown in FIG. 8, the allocation unit 23 changes the number or physical resources to be allocated to the target process, since the determined number of physical resources is different from the current number of physical resources allocated to the target process.

[Variation 3 of Allocation of Physical Resources]

Figure 11:
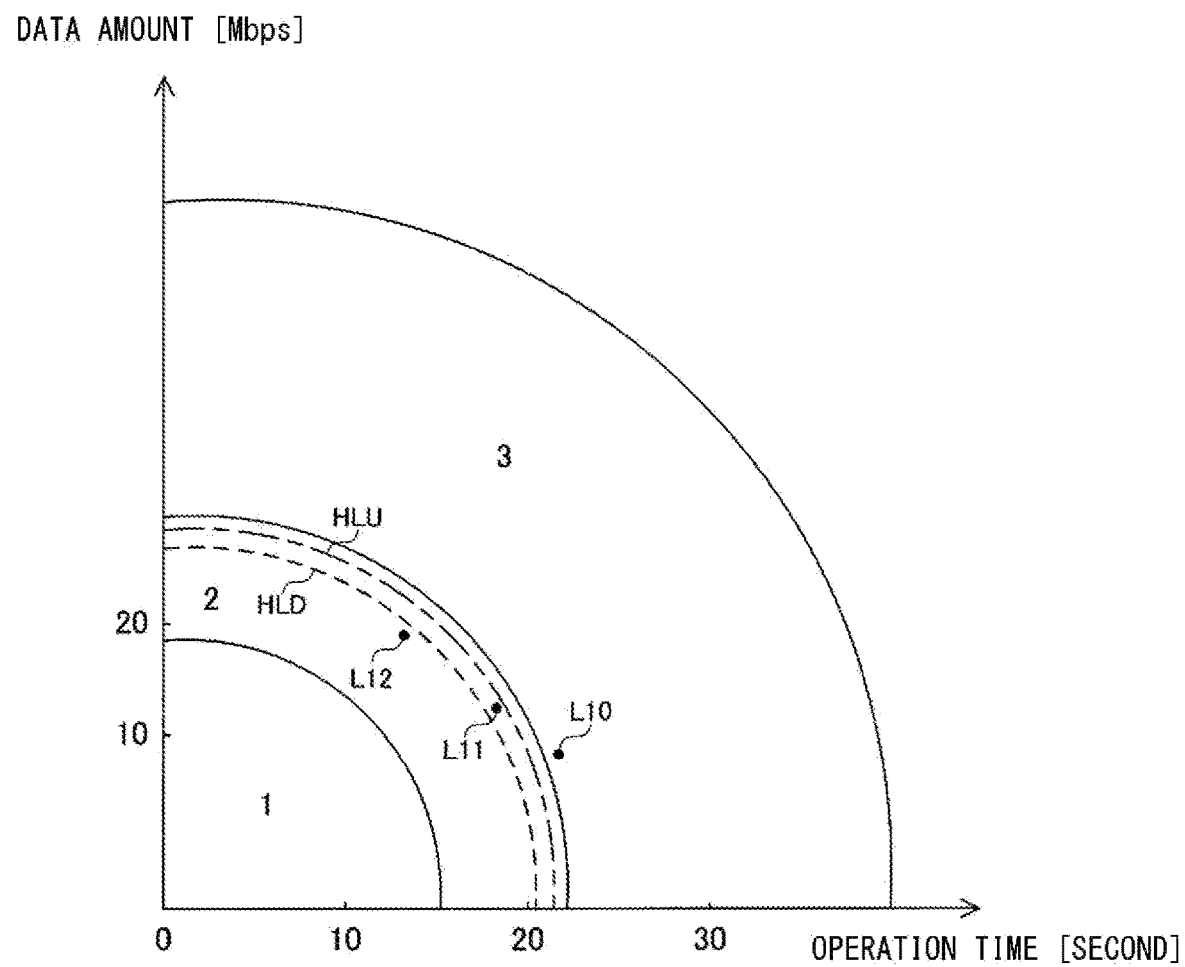
FIG. 11 shows an example, of a judgement content of the load level, in which a plurality of hystereses are provided in the in-vehicle device according to the first embodiment of the present disclosure.

FIG. 11 shows an example, of a judgement content of the load level, in which a plurality of hystereses are provided in the in-vehicle device according to the first embodiment of the present disclosure.

With reference to FIG. 11, in this example, a hysteresis HLU and a hysteresis HLD are provided.

On the basis of state information L10 at a certain timing, the allocation unit 23 judges the load level indicated by the prediction result, i.e., the load level information, to be a load level 3. Here, it is assumed that the allocation unit 23 determines to maintain the number of physical to be allocated to the target process, at the number of physical resources that corresponds to the load level 3.

Next, on the basis of state information L11 at the next timing, the allocation unit 23 judges the load level as a load level 2. At this time, the allocation unit 23 judges that the state information L11 is in a state of being less than the hysteresis HLU and exceeding the hysteresis HLD.

In this case, the allocation unit 23 determines to maintain the number of physical resources to be allocated to the target process, at the number of physical resources that corresponds to the load level 3, instead of the number of physical resources that corresponds to the load level 2 indicated by the prediction result, i.e., the load level information.

Next, on the basis of state information L12 at the next timing, the allocation unit 23 judges the load level to be the load level 2. At this time, the allocation unit 23 judges that the state information L12 is in a state of being less than the hysteresis HLD.

At this time, the allocation unit 23 determines the number of physical resources allocated to the target process, to the number of physical resources that corresponds to the judged load level 2.

Then, for example, with reference to the allocation information shown in FIG. 8, the allocation unit 23 changes the number of physical resources to be allocated to the target process, since the determined number of physical resources is different from the current number of physical resources allocated to the target process.

[Operation of Increasing Physical Resources]

For example, the allocation unit 23 can switch a state where a plurality of physical resources are allocated to a plurality of types of processes, to a state where a greater number of physical resources are to be allocated to the plurality of types of processes.

For example, when the current number of cores 31 allocated to the target process is 2, the allocation unit 23 increases the number of cores 31 to be allocated to the target process, to 3.

More specifically, for example, the allocation unit 23 outputs, to the OS 34, an instruction to increase the number of cores 31 to be allocated to the target process, from 2 to 3.

In accordance with the instruction received from the allocation unit 23, the OS 34 increases the number of cores 31 to be allocated to the target process, from 2 to 3.

For example, when the number of physical resources to be allocated to the target process is to be increased, the allocation unit 23 starts at least one of the power supply and the clock supply to the physical resource that is newly allocated to the target process.

More specifically, in the in-vehicle device 101, when the number of cores 31 to be allocated to the target process has been increased from 2 to 3, the allocation unit 23 starts at least one of the power supply and the clock supply to the core 31 that is newly allocated.

Specifically, for example, the allocation unit 23 outputs, to the OS 34, in addition to the instruction to increase the number of cores 31 to be allocated to the target process from 2 to 3, a start instruction to start at least one of the power supply and the clock supply to the core 31 that is newly allocated.

In accordance with the start instruction received from the allocation unit 23, the OS 34 performs a process of starting at least one of the power supply and the clock supply to the core 31 that is newly allocated.

More specifically, for example, the OS 34 sets the value of a register or the like in the processing unit 21 such that the power supply and the clock supply to the core 31 is performed.

Accordingly, the processing unit 21 sets the switch 37 connected between the core 31 and the clock generation circuit 35 and the switch 37 connected between the core 31 and the power source 36 into an ON-state, thereby causing the power supply and the clock supply to the core 31 to be performed.

[Variation 4 of Allocation of Physical Resources]

The allocation unit 23 may be configured to execute changing of allocation when the state for which the allocation of physical resources should be changed has continued for a predetermined time.

Figure 12:
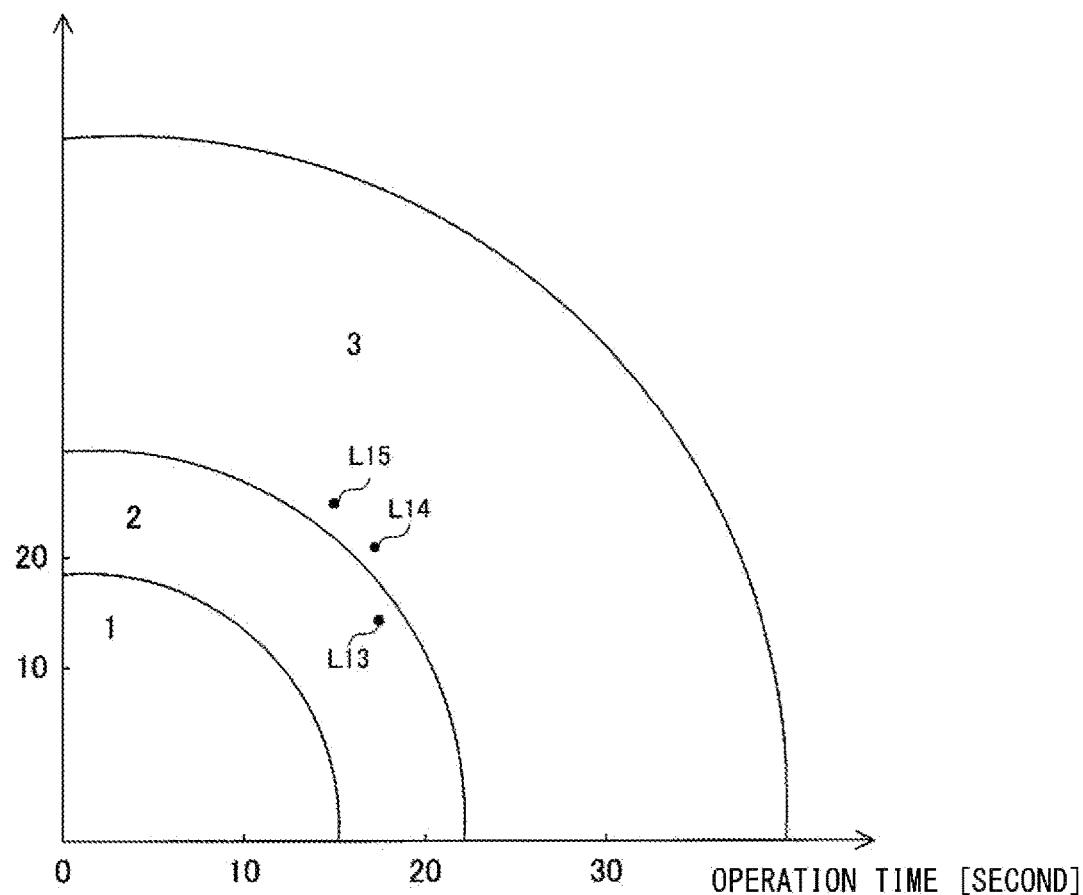
FIG. 12 shows another example in which the in-vehicle device determines allocation of physical resources in accordance with the load level, according to the first embodiment of the present disclosure.

FIG. 12 shows another example in which the in-vehicle device determines allocation of physical resources in accordance with the load level, according to the first embodiment of the present disclosure.

With reference to FIG. 12, on the basis of state information L13 at a certain timing, the allocation unit 23 judges the load level indicated by the prediction result, i.e., the load level information, to be a load level 2. Here, it is assumed that the allocation unit 23 determines to maintain the number of physical resources to be allocated to the target process, at the number of physical resources that corresponds to the load level 2.

Next, on the basis of state information L14 at the next timing, the allocation unit 23 judges the load level to be a load level 3.

At this time, since the duration of the state of the load level 3 is less than a predetermined time, the allocation unit 23 determines to maintain the number of physical resources to be allocated to the target process, at the number of physical resources that corresponds to the load level 2, instead of the number of physical resources that corresponds to the load level 3 indicated by the prediction result, i.e., the load level information.

Next, on the basis of state information L15 at the next timing, the allocation unit 23 judges the load level to be the load level 3.

At this time, since the duration of the state of the load level 3 has continued for a predetermined time, the allocation unit 23 determines the number of physical resources allocated to the target process, to the number of physical resources that corresponds to the judged load level 3.

Then, for example, with reference to the allocation information shown in FIG. 8, the allocation unit 23 changes the number of physical resources to be allocated to the target process, since the determined number of physical resources is different from the current number of physical resources allocated to the target process.

[Variation 5 of Allocation of Physical Resources]

The allocation unit 23 in the in-vehicle device 101 may be configured to provide a hysteresis when the number of physical resources to be allocated to the target process is increased.

In the variation 5 of allocation of physical resources, similar to the variation 4, the allocation unit 23 executes changing of allocation when the state for which the allocation of physical resources should be changed has continued for a predetermined time.

Figure 13:
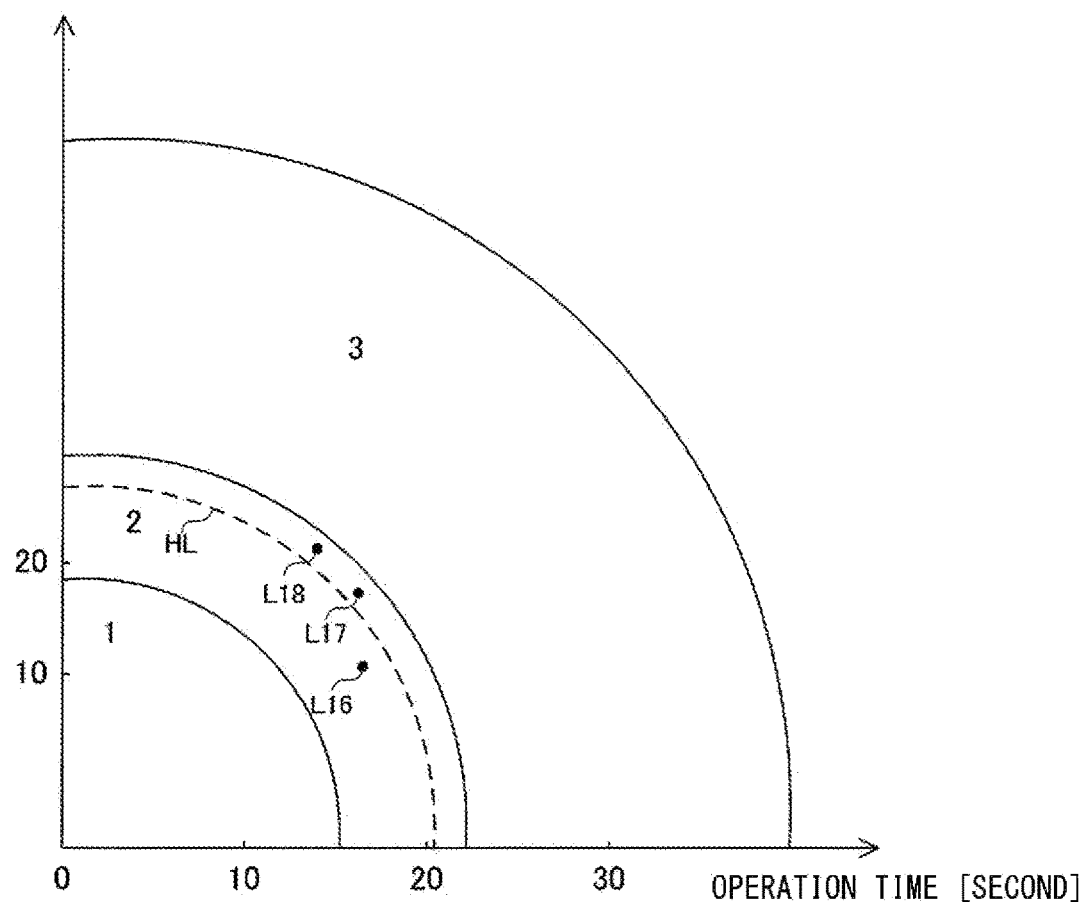
FIG. 13 shows another example, of a judgement content of the load level, in which a hysteresis is provided in the in-vehicle device according to the first embodiment of the present disclosure.

FIG. 13 shows another example, of a judgement content of the load level, in which a hysteresis is provided in the in-vehicle device according to the first embodiment of the present disclosure.

With reference to FIG. 13, on the basis of state information L16 at a certain timing, the allocation unit 23 judges the load level indicated by the prediction result, i.e., the load level information, to be a load level 2. At this time, the allocation unit 23 judges that the state information L16 is in a state of being less than a hysteresis HL.

Next, on the basis of state information L17 at the next timing, the allocation unit 23 judges the load level to be the load level 2, and further, on the basis of state information L18 at the next timing, the allocation unit 23 judges the load level to be the load level 2. At this time, the allocation unit 23 judges that the state information L17 and the state information L18 are each in a state of exceeding the hysteresis HL.

Then, since the duration of the state of exceeding the hysteresis HL has continued for a predetermined time, the allocation unit 23 determines the number of physical resources to be allocated to the target process, to the number of physical resources that corresponds to a load level 3, instead of the number of physical resources that corresponds to the load level 2 indicated by the prediction result, i.e., the load level information.

Then, for example, with reference to the allocation information shown in FIG. 8, the allocation unit 23 changes the number of physical resources to be allocated to the target process, since the determined number of physical resources is different from the current number of physical resources allocated to the target process.

[Variation 6 of Allocation of Physical Resources]

Figure 14:
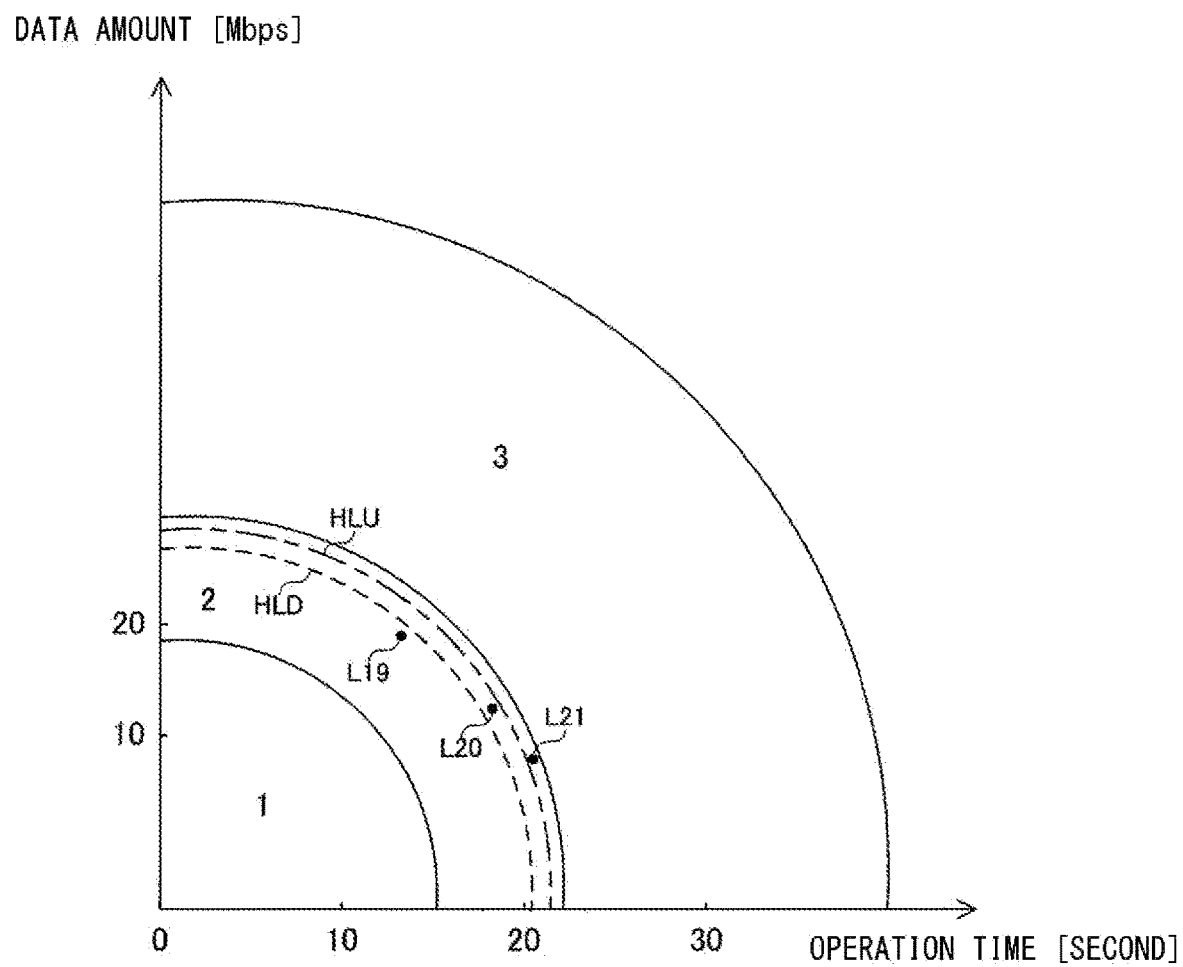
FIG. 14 shows an example, of a judgement content of the load level, in which a plurality of hystereses are provided in the in-vehicle device according to the first embodiment of the present disclosure.

FIG. 14 shows an example, of a judgement content of the load level, in which a plurality of hystereses are provided in the in-vehicle device according to the first embodiment of the present disclosure.

With reference to FIG. 14, in this example a hysteresis HLU and a hysteresis HLD are provided.

On the basis of state information L19 at a certain timing, the allocation unit 23 judges the load level indicated by the prediction result, i.e., the load level information, to be a load level 2. At this time, the allocation unit 23 judges that the state information L19 is in a state of being less than the hysteresis HLD.

Next, on the basis of state information L20 at the next timing, the allocation unit 23 judges the load level to be the load level 2. At this time, the allocation unit 23 judges that the state information L20 is in a state of being less than the hysteresis HLU and exceeding the hysteresis HLD.

Next, on the basis of state information L21 at the next timing, the allocation unit 23 judges the load level to be the load level 2. At this time, the allocation unit 23 judges that the state information L21 is a state of exceeding the hysteresis HLU.

In this case, the allocation unit 23 determines the number of physical resources to be allocated to the target process, to the number of physical resources that corresponds to a load level 3, instead of the number of physical resources that corresponds to the load level 2 indicated by the prediction result, i.e., the load level information.

Then, for example, with reference to the allocation information shown in FIG. 8, the allocation unit 23 changes the number of physical resources to be allocated to the target process, since the determined number of physical resources is different from the current number of physical resources allocated to the target process.

[Modification]

In the in-vehicle device 101, allocation of physical resources may be changed on the basis of the degrees of wear of physical resources.

In this case, the acquisition unit 22 further acquires a plurality of pieces of wear information regarding the respective degrees of wear of a plurality of physical resources.

More specifically, the acquisition unit 22 monitors the operation time of each of the cores 31, the memories 32, and the IF circuits 33. Specifically, for example, the acquisition unit 22 creates, at each predetermined time interval, wear information indicating the operation time for each physical resource, and stores the wear information into the storage unit 24.

The wear information may be information based on the operation time. More specifically, for example, when the power consumption, the life, and the like differ for each physical resource, the wear information may indicate the degree of wear calculated on the basis of the operation time acquired by the acquisition unit 22, and the power consumption, the life, and the like of the physical resource that corresponds to the operation time.

FIG. 15 shows an example of wear information used in the in-vehicle device according to the first embodiment of the present disclosure.

With reference to FIG. 15, the operation time of the core 31A is 100 hours, the operation time of the core 31B is 200 hours, the operation time of the core 31C is 50 hours, the operation time of the memory 32A is 100 hours, and the operation time of the IF circuit 33A is 100 hours.

The allocation unit 23 changes the allocation of physical resources further on the basis of the wear information acquired by the acquisition unit 22.

For example, the allocation unit 23 includes, into an instruction to decrease the number of cores 31 to be allocated to the target process, information indicating a core 31 to be excluded from the allocation to the target process, and outputs the resultant instruction to the OS 34.

More specifically, when the number of cores 31 to be allocated to the target process is to be decreased, the allocation unit 23 refers to the wear information in the storage unit 24, and excludes, from the allocation, cores 31 that have a longer operation time in the wear information, in order.

Specifically, for example, when the number of cores 31 to be allocated is to be decreased from 3 to 2, the allocation unit 23 includes, into the instruction above, the core 31B, which is the core 31 that has the longest operation time in the wear information shown in FIG. 15.

For example, the allocation unit 23 includes, into an instruction to increase the number of cores 31 to be allocated to the target process, information indicating a core 31 to be newly allocated to the target process, and outputs the resultant instruction to the OS 34.

More specifically, when the number of cores 31 to be allocated to the target process is to be increased, the allocation unit 23 refers to the wear information in the storage unit 24, and allocates cores 31 that have a shorter operation time in the wear information, in order.

Specifically, for example, when the number of cores 31 to be allocated is to be increased from 2 to 3, the allocation unit 23 includes, into the instruction above, the core 31C, which is the core 31 that has the shortest operation time in the wear information shown in FIG. 15.

[Operation Flow]

Each device in the in-vehicle communication system according to the embodiment of the present disclosure includes a computer that includes a memory. An arithmetic processing unit such as a CPU in the computer reads out, from the memory, a program including a part or all of the steps in the sequence or flow chart below, and executes the program. Programs for the plurality of devices can be installed from outside. The programs for the plurality of devices are each distributed in a state of being stored in a storage medium.

Figure 16:
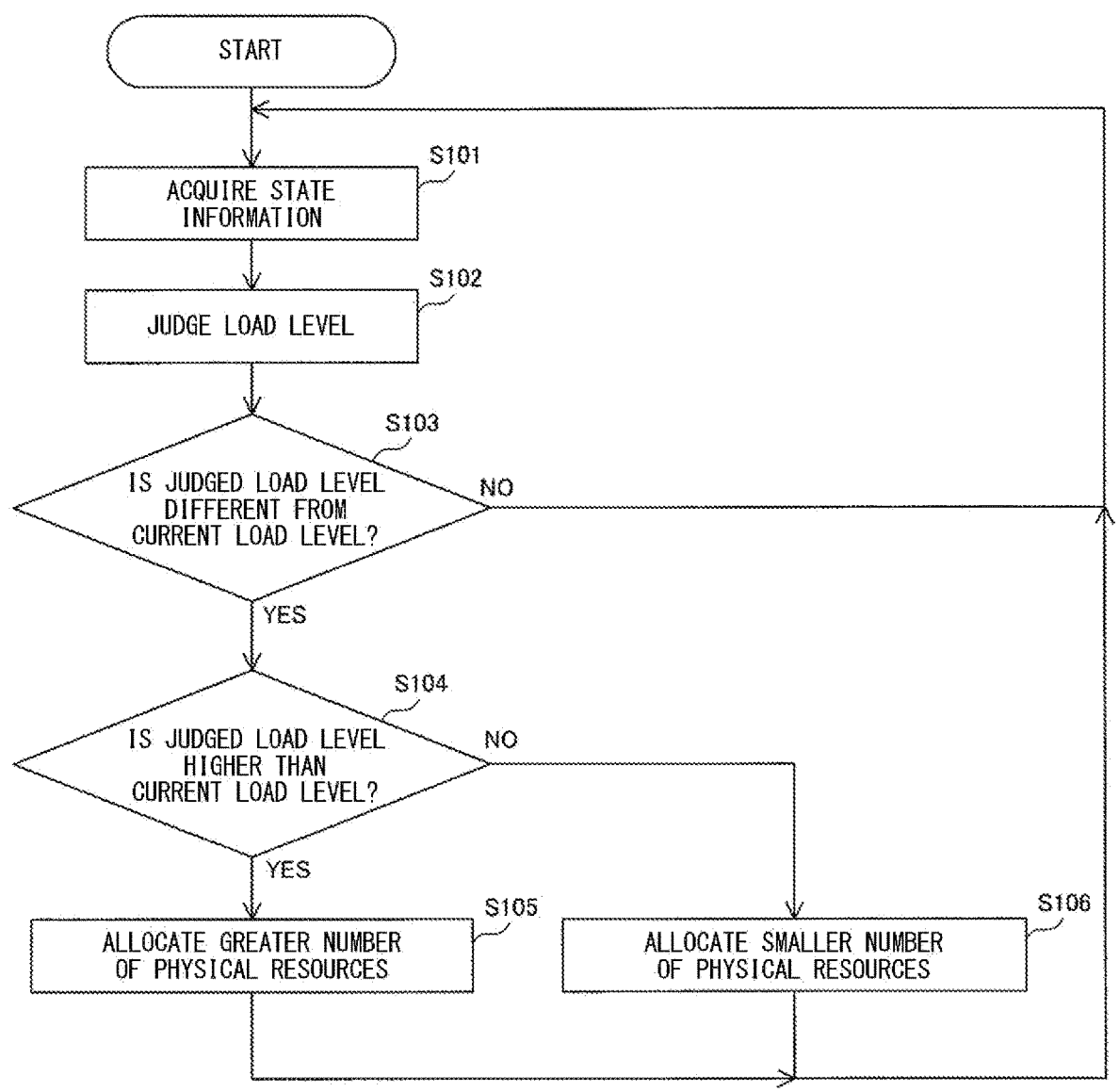
FIG. 16 is a flow chart describing an operation procedure according to which the in-vehicle device manages physical resources of the in-vehicle device, according to the first embodiment of the present disclosure.

FIG. 16 is a flow chart describing an operation procedure according to which the in-vehicle device manages physical resources of the in-vehicle device, according to the first embodiment of the present disclosure.

With reference to FIG. 16, first, the in-vehicle device 101 acquires state information indicating the state of the vehicle 1 (step S101).

Next, on the basis of the acquired state information, the in-vehicle device 101 judges the load level of the in-vehicle device 101. That is, the in-vehicle device 101 predicts the processing load of the in-vehicle device 101 (step S102).

Next, the in-vehicle device 101 changes allocation of physical resources to be used in the target process in accordance with the prediction result, i.e., the judged load level. More specifically, when the judged load level is different from the current load level of the in-vehicle device 101 (YES in step S103), the in-vehicle device 101 changes the allocation of physical resources. The in-vehicle device 101 may change the allocation when a hysteresis for a state for which the allocation should be changed is provided, or when a state for which the allocation should be changed has continued for a predetermined time (step S104).

When the judged load level is higher than the current load level of the in-vehicle device 101 (YES in step S104), the in-vehicle device 101 switches to a state where a greater number of physical resources are to be allocated to the target process. At this time, for example, the in-vehicle device 101 allocates cores 31 that have a shorter operation time in the wear information, in order (step S105). Then, the in-vehicle device 101 acquires state information at the next timing (step S101).

Meanwhile, when the judged load level is lower than the current load level of the in-vehicle device 101 (NO in step S104), the in-vehicle device 101 switches to a state where a smaller number of physical resources are to be allocated to the target process. At this time, for example, the in-vehicle device 101 excludes, from the allocation, cores 31 that have a longer operation time in the wear information, in order (step S106). Then, the in-vehicle device 101 acquires state information at the next timing (step S101).

Meanwhile, when the judged load level is the same as the current load level of the in-vehicle device 101 (NO in step S103), the in-vehicle device 101 acquires state information at the next timing without changing the allocation of physical resources (step S101).

In the in-vehicle device 101 according to the first embodiment of the present disclosure, the allocation unit 23 is configured to predict a processing load regarding the target process of the in-vehicle device 101 on the basis of state information. However, the present disclosure is not limited thereto. The allocation unit 23 may be configured not to perform prediction of the processing load. More specifically, for example, the allocation unit 23 may be configured to change allocation of physical resources on the basis of state information, without judging the load level.

In the in-vehicle device 101 according to the first embodiment of the present disclosure, the allocation unit 23 is configured to determine the number of useable physical resources in accordance with the state indicated by state information. However, the present disclosure is not limited thereto. The allocation unit 23 may be configured not to determine the number of useable physical resources. In this case, for example, the allocation unit 23 outputs, to the OS 34, an instruction to increase or decrease physical resources to be allocated to the target process, without determining the number of physical resources.

The in-vehicle device 101 according to the first embodiment of the present disclosure is configured to stop at least one of the power supply and the clock supply to the physical resource to be excluded from the allocation to the target process. However, the present disclosure is not limited thereto. The in-vehicle device 101 may be configured not to stop the power supply and the clock supply to the physical resource.

The in-vehicle device 101 according to the first embodiment of the present disclosure is a central gateway as an example. However, the present disclosure is not limited thereto. For example, the in-vehicle device 101 may be an electronic control unit different from the central gateway.

Meanwhile, in association with advancement of devices, it is considered that, in vehicles, integration of functions of a plurality of ECUs will be promoted, i.e., one in-vehicle device will provide a plurality of applications.

Power consumption of an in-vehicle device increases in association with increase of applications that should be provided by the in-vehicle device. Such an increase in power consumption has a great influence on the cruising distance of an electric vehicle, for example.

Meanwhile, in the in-vehicle device according to the first embodiment of the present disclosure, the acquisition unit 22 acquires state information indicating the state of the vehicle 1. The allocation unit 23 changes, in accordance with the state indicated by the state information acquired by the acquisition unit 22, allocation of physical resources to be used in a target process being one or a plurality of types of processes that should be performed by the in-vehicle device 101.

As described above, in accordance with the state of the vehicle 1 having the in-vehicle device 101 mounted thereto, with respect to a plurality of physical resources in the in-vehicle device 101, allocation of physical resources that should be caused to execute the target process is changed. According to this configuration, it is possible to select appropriate physical resources in accordance with the state of the vehicle 1, and to cause the physical resources to perform the target process.

Therefore, in the in-vehicle device according to the first embodiment of the present disclosure, it is possible to effectively reduce power consumption while executing necessary processes.

In the in-vehicle device according to the first embodiment of the present disclosure, on the basis of state information, the allocation unit 23 predicts the processing load of the in-vehicle device 101 and changes allocation of physical resources in accordance with the prediction result.

According to this configuration, a more appropriate allocation content in consideration of the processing load, of the in-vehicle device 101, predicted from the state of the vehicle 1 can be determined. That is, allocation of physical resources can be caused to follow the load, of the target process, which increases or decreases in accordance with the state of the vehicle 1.

In the in-vehicle device according to the first embodiment of the present disclosure, in accordance with the state indicated by state information, the allocation unit 23 determines the number of useable physical resources, and allocates the determined number of physical resources to the target process.

According to this configuration, the number of useable physical resources can be increased or decreased in accordance with the state of the vehicle 1. Thus, power consumption can be more effectively reduced.

In the in-vehicle device according to the first embodiment of the present disclosure, the allocation unit 23 can switch a state where a plurality of physical resources are allocated to a plurality of types of processes that should be performed by the in-vehicle device 101, to a state where a smaller number of physical resources than the number of physical resources allocated to the plurality of types of processes are to be allocated to the plurality of types of processes.

According to this configuration, a part or all of the plurality of types of processes can be caused to be implemented using common physical resources when compared with the state before the change. Therefore, more efficient use of physical resources is enabled. In addition, there is no need to perform arbitration of the execution timing between a plurality of applications that respectively execute a plurality of types of processes. Thus, reduction of power consumption can be easily realized without adding an arbitration function to an application.

In the in-vehicle device according to the first embodiment of the present disclosure, when the number of physical resources to be allocated to the target process is to be decreased, the allocation unit 23 stops at least one of the power supply and the clock supply to the physical resource to be excluded from the allocation to the target process.

According to this configuration, power consumption of unused physical resources can be reduced to a greater extent.

In the in-vehicle device according to the first embodiment of the present disclosure, the allocation unit 23 executes changing of allocation when a hysteresis is provided in a case where the number of physical resources to be allocated to the target process is to be decreased and in a case where the number of physical resources to be allocated to the target process is to be increased, or when a state for which the allocation of physical resources should be changed has continued for a predetermined time.

According to this configuration, a situation where the allocation content of physical resources is frequently changed can be suppressed, and operation of the in-vehicle device 101 can be stabilized.

In the in-vehicle device according to the first embodiment of the present disclosure, the acquisition unit 22 acquires a plurality of pieces of wear information regarding the respective degrees of wear of a plurality of physical resources. The allocation unit 23 changes allocation of physical resources further on the basis of each of the pieces of wear information acquired by the acquisition unit 22.

According to this configuration, increase of the degree of wear of a specific physical resource can be suppressed, and the useable time of the in-vehicle device can be further extended.

In the resource management method to be performed in the in-vehicle device according to the first embodiment of the present disclosure, first, state information indicating a state of the vehicle 1 is acquired. Next, in accordance with the state indicated by the acquired state information, allocation of physical resources to be used in the target process being one or a plurality of types of processes that should be performed by the in-vehicle device 101, is changed.

As described above, in accordance with the state of the vehicle 1 having the in-vehicle device 101 mounted thereto, with respect to a plurality of physical resources in the in-vehicle device 101, allocation of physical resources that should be caused to execute the target process is changed. According to this configuration, it is possible to select appropriate physical resources in accordance with the state of the vehicle 1, and to cause the physical resources to perform the target process.

Therefore, in the resource management method to be performed in the in-vehicle device according to the first embodiment of the present disclosure, it is possible to effectively reduce power consumption while executing necessary processes, in the in-vehicle device.

Next, another embodiment of the present disclosure will be described with reference to the drawings. In the drawings, the same or corresponding parts are denoted by the same reference signs, and descriptions thereof are not repeated.

Second Embodiment

The present embodiment relates to an in-vehicle device for which prediction of the processing load of the in-vehicle device is performed outside the in-vehicle device, when compared with the in-vehicle device according to the first embodiment. Contents other than the contents described below are the same as those regarding the in-vehicle device according to the first embodiment.

Figure 17:
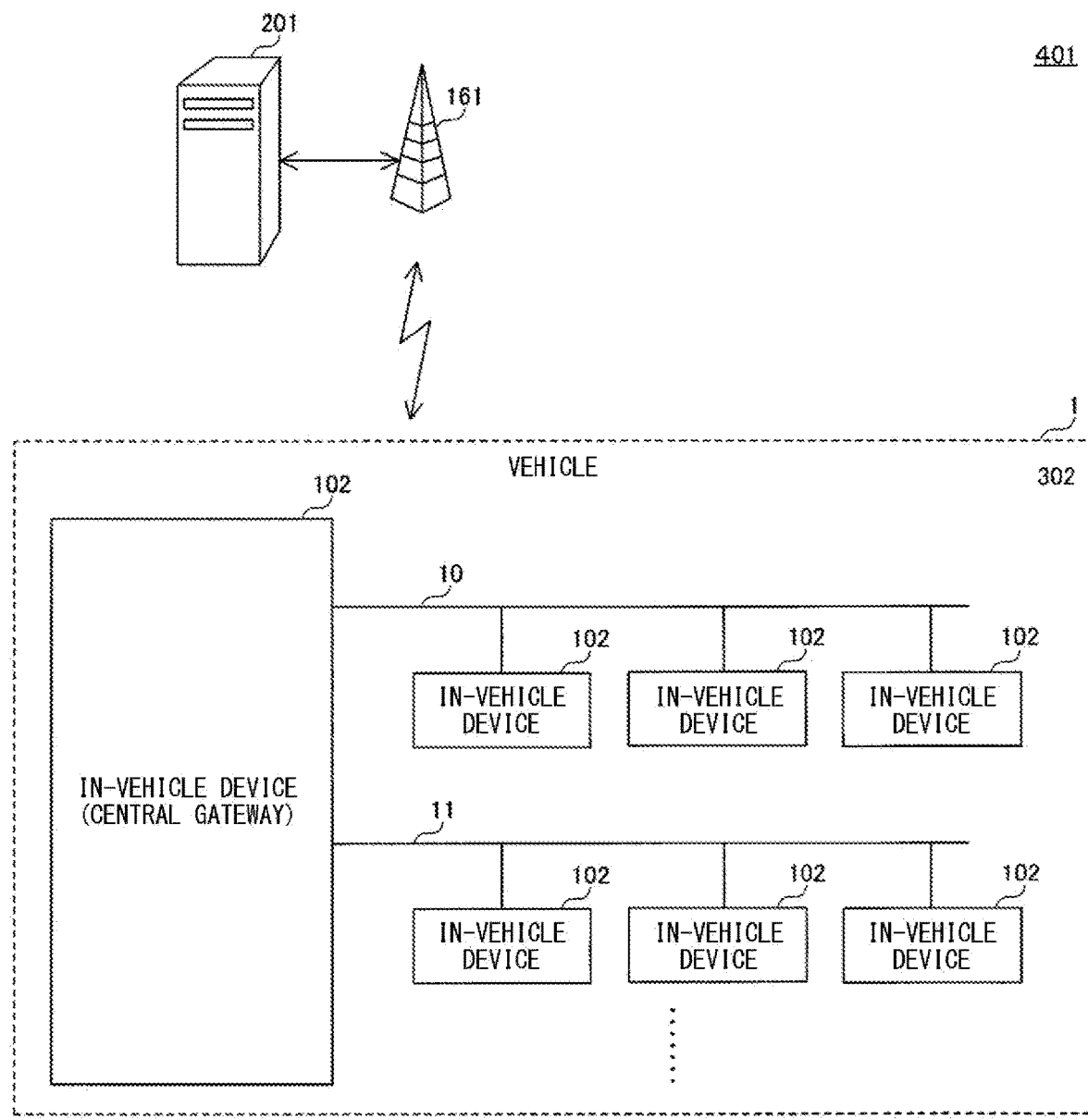
FIG. 17 shows a configuration of a vehicle management system according to a second embodiment of the present disclosure.

FIG. 17 shows a configuration of a vehicle management system according to a second embodiment of the present disclosure.

With reference to FIG. 17, a vehicle management system 401 includes an in-vehicle communication system 302, and a management apparatus 201. The in-vehicle communication system 302 includes an in-vehicle device 102 instead of the in-vehicle device 101, when compared with the in-vehicle communication system 301 shown in FIG. 1. The in-vehicle device 102 and the management apparatus 201 are each a server, for example.

The configuration of the function block of the in-vehicle device 102 is similar to that of the in-vehicle device 101 shown in FIG. 2.

The in-vehicle device 102 has further installed therein software SW6 (not shown) that has a function of a TCU (Telematics Communication Unit) that performs a process of wireless communication with a wireless base station apparatus 161 in accordance with a communication standard such as LTE (Long Term Evolution), 4G, 5G, or the like, when compared with the in-vehicle device 101 shown in FIG. 3, for example. The software SW6 functions as the communication unit 25 shown in FIG. 2.

The in-vehicle device 102 can communicate, by using the software SW6, with the management apparatus 201 outside the vehicle 1 via the wireless base station apparatus 161.

The communication unit 25 in the in-vehicle device 102 transmits state information indicating the state of the vehicle 1, to the management apparatus 201.

More specifically, the acquisition unit 22 in the in-vehicle device 102 creates state information described above, for example, and outputs the state information to the processing unit 21.

The processing unit 21 transmits through wireless communication the state information received from the acquisition unit 22, to the management apparatus 201 via the communication unit 25 and the wireless base station apparatus 161.

The management apparatus 201 receives the state information transmitted from the in-vehicle device 102, and stores the received state information into a storage unit (not shown).

Then, on the basis of the state information received from the in-vehicle device 102, the management apparatus 201 predicts a processing load of the in-vehicle device 102.

That is, similar to the processing unit 21 in the in-vehicle device 101, the management apparatus 201 creates a judgement model as an example of a machine learning model.

Then, similar to the allocation unit 23 in the in-vehicle device 101, the management apparatus 201 judges, by using the created judgement model, the load level of the in-vehicle device 102 on the basis of the state information received from the in-vehicle device 102.

The management apparatus 201 transmits, for example, load level information as load information indicating the prediction result, to the in-vehicle device 102.

The communication unit 25 in the in-vehicle device 102 receives, via the wireless base station apparatus 161, the load level information transmitted from the management apparatus 201, and outputs the received load level information to the processing unit 21.

The processing unit 21 outputs the load level information received from the communication unit 25, to the allocation unit 23.

On the basis of the load level information received from the processing unit 21 and the allocation information in the storage unit 24, the allocation unit 23 determines the number of physical resources to be allocated to the target process, and changes the allocation of physical resources to be used in the target process.

Figure 18:
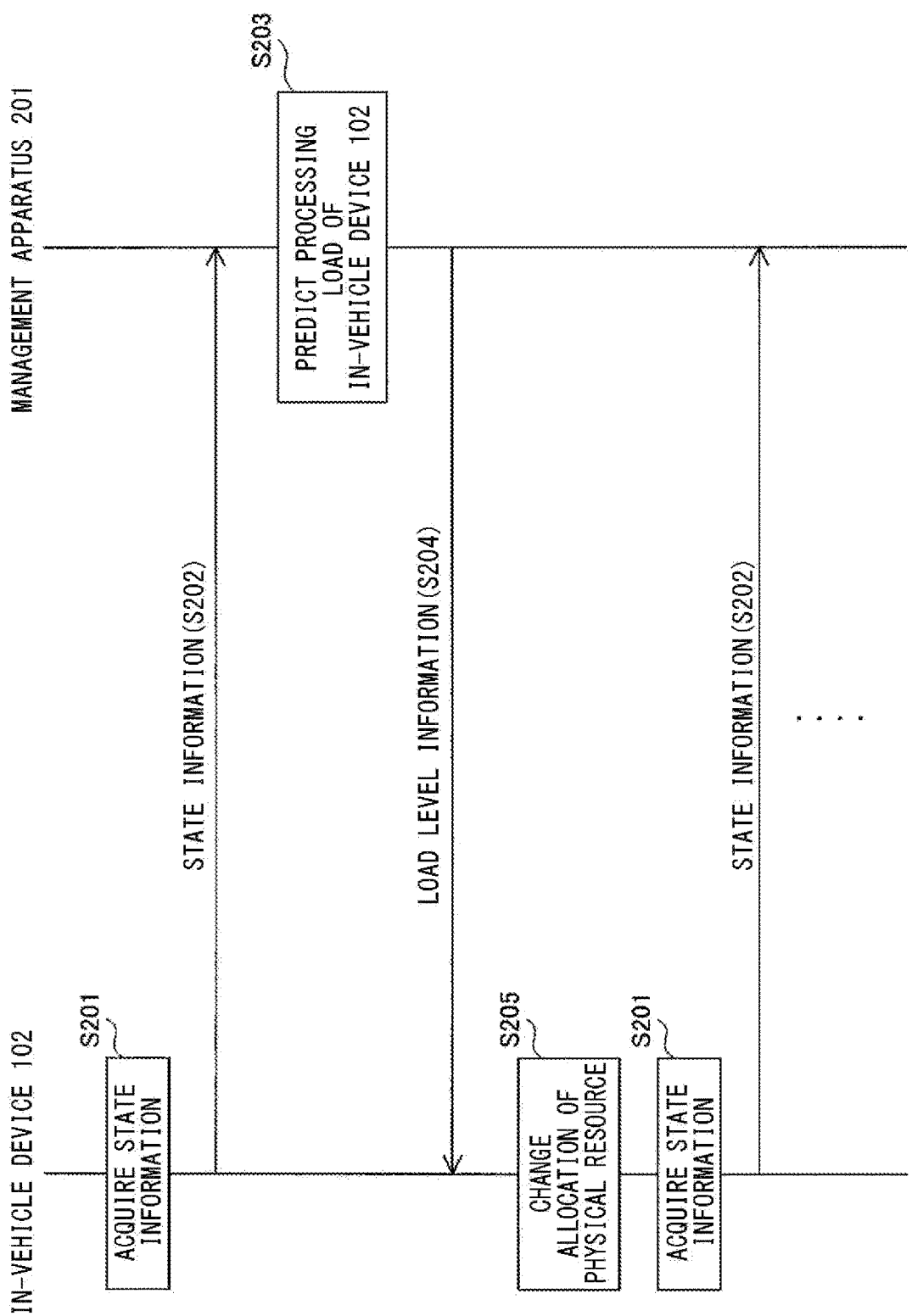
FIG. 18 shows a sequence of management, of physical resources in an in-vehicle device, performed in the vehicle management system according to the second embodiment of the present disclosure.

FIG. 18 shows a sequence of management, of physical resources in the in-vehicle device, performed in the vehicle management system according to the second embodiment of the present disclosure.

With reference to FIG. 18, first, the in-vehicle device 102 acquires state information indicating the state of the vehicle 1 (step S201).

Next, the in-vehicle device 102 transmits the acquired state information to the management apparatus 201 (step S202).

Next, the management apparatus 201 receives the state information transmitted from the in-vehicle device 102, and predicts a processing load of the in-vehicle device 102 on the basis of the received state information. That is, the management apparatus 201 judges the load level of the in-vehicle device 102 on the basis of the received state information (step S203).

Next, the management apparatus 201 transmits, for example, load level information as load information indicating the prediction result, to the in-vehicle device 102 (step S204).

Next, the in-vehicle device 102 changes allocation of physical resources to be used in the target process, in accordance with the prediction result indicated by the load information. More specifically, the in-vehicle device 102 receives the load level information transmitted from the management apparatus 201, determines the number of physical resources to be allocated to the target process, on the basis of the received load level information, and changes the allocation of physical resources to be used in the target process (step S205).

Thereafter, the in-vehicle device 102 and the management apparatus 201 repeat the operations similar to those in step S201 to step S205.

As described above, in the vehicle management system according to the second embodiment of the present disclosure, the in-vehicle device 102 includes a plurality of physical resources. The in-vehicle device 102 transmits state information indicating the state of the vehicle 1, to the management apparatus 201. On the basis of the state information received from the in-vehicle device 102, the management apparatus 201 predicts a processing load of the in-vehicle device 102, and transmits load information indicating the prediction result, to the in-vehicle device 102. The in-vehicle device 102 changes the allocation of physical resources to be used in the target process being one or a plurality of types of processes that should be performed by the in-vehicle device 102, in accordance with the prediction result indicated by the load information received from the management apparatus 201.

As described above, in accordance with the state of the vehicle 1 having the in-vehicle device 102 mounted thereto, with respect to a plurality of physical resources in the in-vehicle device 102, allocation of physical resources that should be caused to execute the target process is changed. According to this configuration, it is possible to select appropriate physical resources in accordance with the state of the vehicle 1, and to cause the physical resources to perform the target process.

Therefore, in the vehicle management system according to the second embodiment of the present disclosure, it is possible to effectively reduce power consumption while executing necessary processes, in the in-vehicle device.

In the resource management method to be performed in the vehicle management system according to the second embodiment of the present disclosure, first, the in-vehicle device 102 transmits state information indicating the state of the vehicle, to the management apparatus 201. Next, on the basis of the state information received from the in-vehicle device 102, the management apparatus 201 predicts a processing load of the in-vehicle device, and transmits load information indicating the prediction result, to the in-vehicle device 102. Next, on the basis of the prediction result indicated by the load information received from the management apparatus 201, the in-vehicle device 102 changes the allocation of physical resources to be used in the target process being one or a plurality of types of processes that should be performed by the in-vehicle device 102.

As described above, in accordance with the state of the vehicle 1 having the in-vehicle device 102 mounted thereto, with respect to a plurality of physical resources in the in-vehicle device 102, allocation of physical resources that should be caused to execute the target process is changed. According to this configuration, it is possible to select appropriate physical resources in accordance with the state of the vehicle 1, and to cause the physical resources to perform the target process.

Therefore, in the resource management method according to the second embodiment of the present disclosure, it is possible to effectively reduce power consumption while executing necessary processes, in the in-vehicle device.

The other configurations and operations are the same as those of the in-vehicle device according to the first embodiment, and thus, detailed description thereof is not repeated here.

It should be noted that the above embodiments are merely illustrative and not restrictive in all aspects. The scope of the present invention is defined by the scope of the claims rather than the above description, and is intended to include meaning equivalent to the scope of the claims and all modifications within the scope.

The above description includes the features in the additional notes below.

[Additional Note 1]

An in-vehicle device mounted to a vehicle, the in-vehicle device comprising:
 an acquisition unit configured to acquire state information indicating a state of the vehicle;
 a plurality of physical resources; and
 an allocation unit configured to change, in accordance with the state indicated by the state information acquired by the acquisition unit, allocation of the physical resources to be used in a target process being one or a plurality of types of process that should be performed by the in-vehicle device, wherein
 the allocation unit predicts a processing load of the in-vehicle device regarding the target process on the basis of the state information.

[Additional Note 2]

A vehicle management system comprising:
 an in-vehicle device including a plurality of physical resources; and
 a management apparatus, wherein
 the in-vehicle device transmits state information indicating a state of the vehicle, to the management apparatus,
 the management apparatus predicts a processing load of the in-vehicle device on the basis of the state information received from the in-vehicle device, and transmits load information indicating a prediction result, to the in-vehicle device,
 in accordance with the prediction result indicated by the load information received from the management apparatus, the in-vehicle device changes allocation of the physical resource to be used in a target process being one or a plurality of types of processes that should be performed by the in-vehicle device, and the in-vehicle device predicts a processing load of the in-vehicle device regarding the target process on the basis of the state information.

REFERENCE SIGNS LIST 1 vehicle
10 CAN bus
11 Ethernet cable
21 processing unit
22 acquisition unit
23 allocation unit
24 storage unit
25 communication unit
31, 31A, 31B, 31C, 31D core
32, 32A, 32B memory
33, 33A, 33B IF circuit
34 OS
35 clock generation circuit
36 power source
37 switch
101, 102 in-vehicle device
161 wireless base station apparatus
201 management apparatus
301 in-vehicle communication system
401 vehicle management system

The invention claimed is:

1. An in-vehicle device mounted to a vehicle, the in-vehicle device comprising:
a plurality of physical resources;
a storage unit configured to store a determination model for determining a load level of the in-vehicle device based on a speed of the vehicle, a number of pieces of software in operation, a running time of the software in operation, and an amount of data transmitted between the plurality of physical resources; and
an allocation unit configured to:
change, in accordance with a value of the determined load level, which of the physical resources are allocated to be used in a target process, different from the software in operation, being one or a plurality of types of processes performed by the in-vehicle device,
decrease a number of physical resources of the plurality of physical resources allocated to the target process by excluding a first physical resource of the plurality of physical resources when the value of the determined load level is smaller than a threshold, and
move the target process executed by the first physical resource to a second physical resource of the physical resources such that at least a portion of the first physical resource is unavailable for use when the first physical resource is excluded.

2. The in-vehicle device according to claim 1, wherein the allocation unit predicts a processing load of the in-vehicle device on the basis of the value of the determined load level, and changes the allocation in accordance with a prediction result.

3. The in-vehicle device according to claim 1, wherein in accordance with a state indicated by the value of the determined load level, the allocation unit determines the number of the physical resources that are useable, and allocates the determined number of the physical resources to the target process.

4. The in-vehicle device according to claim 1, wherein the allocation unit is configured to switch a state where a plurality of the physical resources are allocated to a plurality of types of processes performed by the in-vehicle device, to a state where a smaller number of the physical resources than the number of the physical resources allocated to the plurality of types of processes are to be allocated to the plurality of types of processes.

5. The in-vehicle device according to claim 1, wherein when the number of the physical resources to be allocated to the target process is to be decreased, the allocation unit stops at least one of power supply and clock supply to the first physical resource to be excluded from the allocation to the target process.

6. The in-vehicle device according to claim 1, wherein the allocation unit is configured to change which of the physical resources are allocated
(i) when a hysteresis is provided in a case where the number of the physical resources to be allocated to the target process is to be decreased and in a case where the number of the physical resources to be allocated to the target process is to be increased, or
(ii) when a state for which the allocation of the physical resources should be changed has continued for a predetermined time.

7. The in-vehicle device according to claim 1, wherein the in-vehicle device further acquires a plurality of pieces of wear information regarding respective degrees of wear of the plurality of physical resources, and
the allocation unit changes which of the physical resources are allocated further on the basis of each of the pieces of wear information.

8. The in-vehicle device according to claim 1, wherein the allocation unit predicts a processing load of the in-vehicle device on the basis of the value of the determined load level using a decision criteria in accordance with a speed of the vehicle, and changes the allocation in accordance with a prediction result.

9. A vehicle management system comprising:
an in-vehicle device mounted to a vehicle and including a plurality of physical resources; and
a management apparatus, wherein
the in-vehicle device transmits a speed of the vehicle, a number of pieces of software in operation, a running time of the software in operation, and an amount of data transmitted between the plurality of physical resources, to the management apparatus,
when the management apparatus predicts that a processing load of the in-vehicle device is smaller than a threshold on the basis of information received from the in-vehicle device, the management apparatus transmits load information indicating a prediction result to the in-vehicle device, and
in accordance with the prediction result indicated by the load information received from the management apparatus, the in-vehicle device
decreases a number of physical resources of the plurality of physical resources allocated to be used in a target process, different from the software in operation, by excluding a first physical resource of the plurality of physical resources, the target process being one or a plurality of types of processes performed by the in-vehicle device, and
moves the target process executed by the first physical resource to a second physical resource of the physical resources such that at least a portion of the first physical resource is unavailable for use when the first physical resource is excluded.

10. A resource management method performed in an in-vehicle device that is mounted to a vehicle and includes a plurality of physical resources, the resource management method comprising:
  a step of determining a load level of the in-vehicle device based on a speed of the vehicle, a number of pieces of software in operation, a running time of the software in operation, and an amount of data transmitted between the plurality of physical resources;
  a step of decreasing, when a value of the determined load level is smaller than a threshold, a number of physical resources of the plurality of resources allocated to be used in a target process, different from the software in operation, by excluding a first physical resource of the plurality of physical resources, the target process being one or a plurality of types of processes performed by the in-vehicle device; and
  a step of moving the target process executed by the first physical resource to a second physical resource of the physical resources such that at least a portion of the first physical resource is unavailable for use when the first physical resource is excluded.

11. A resource management method performed in a vehicle management system that includes a management apparatus and an in-vehicle device mounted to a vehicle and including a plurality of physical resources, the resource management method comprising:
  a step, performed by the in-vehicle device, of transmitting a speed of the vehicle, a number of pieces of software in operation, a running time of the software in operation, and an amount of data transmitted between the plurality of physical resources, to the management apparatus;
  a step, performed by the management apparatus, of predicting that a processing load of the in-vehicle device is smaller than a threshold on the basis of information received from the in-vehicle device, the management apparatus transmitting load information indicating a prediction result to the in-vehicle device;
  a step, performed by the in-vehicle device, of decreasing, when a value of the prediction result indicated by the load information received from the management apparatus is smaller than a threshold, a number of physical resources of the plurality of resources allocated to be used in a target process, different from the software in operation, by excluding a first physical resource of the plurality of physical resources, the target process being one or a plurality of types of processes performed by the in-vehicle device; and
  a step, performed by the in-vehicle device, of moving the target process executed by the first physical resource to a second physical resource of the physical resources such that at least a portion of the first physical resource is unavailable for use when the first physical resource is excluded.

12. A non-transitory computer readable storage medium storing a resource management program to be used in an in-vehicle device that is mounted to a vehicle and includes a plurality of physical resources, the resource management program being for causing a computer to function as:
  a storage unit that configured to store a determination model for determining a load level of the in-vehicle device based on a speed of the vehicle, a number of pieces of software in operation, a running time of the software in operation, and an amount of data transmitted between the plurality of physical resources; and
  an allocation unit configured to
    change, in accordance with a value of the determined load level, which of the physical resources are allocated to be used in a target process, different from the software in operation, being one or a plurality of types of processes performed by the in-vehicle device,
    decrease a number of physical resources of the plurality of physical resources allocated to the target process by excluding a first physical resource of the plurality of physical resources when a value of the load level is smaller than a threshold, and
    move the target process executed by the first physical resource to a second physical resource of the physical resources such that at least a portion of the first physical resource is unavailable for use when the first physical resource is excluded.

13. A non-transitory computer readable storage medium storing a resource management program to be used in an in-vehicle device in a vehicle management system, the in-vehicle device being mounted to a vehicle and including a plurality of physical resources, the vehicle management system including the in-vehicle device and a management apparatus, the resource management program being for causing a computer to function as:
  a communication unit configured to transmit a speed of the vehicle, a number of pieces of software in operation, a running time of the software in operation, and an amount of data transmitted between the plurality of physical resources, to the management apparatus, and to receive from the management apparatus, load information predicted by the management apparatus on the basis of information received from the in-vehicle device; and
  an allocation unit configured to
    change, in accordance with the prediction result indicated by the load information from the management apparatus received by the communication unit, which of the physical resources are allocated to be used in a target process, different from the software in operation, being one or a plurality of types of processes performed by the in-vehicle device,
    decrease a number of physical resources of the plurality of physical resources allocated to the target process by excluding a first physical resource of the plurality of physical resources when the load information is smaller than a threshold, and
    move the target process executed by the first physical resource to a second physical resource of the physical resources such that at least a portion of the first physical resource is unavailable for use when the first physical resource is excluded.

* * * * *